US009058529B2

(12) United States Patent
Renfro, Jr. et al.

(10) Patent No.: US 9,058,529 B2
(45) Date of Patent: Jun. 16, 2015

(54) RFID-BASED SYSTEMS AND METHODS FOR COLLECTING TELECOMMUNICATIONS NETWORK INFORMATION

(71) Applicant: Corning Cable Systems, Hickory, NC (US)

(72) Inventors: James G. Renfro, Jr., Hickory, NC (US); Richard E. Wagner, Painted Post, NY (US); Matthew S. Whiting, Lawrenceville, PA (US); Dale A. Webb, Corning, NY (US); James S. Sutherland, Corning, NY (US); John D. Downie, Painted Post, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 13/965,484

(22) Filed: Aug. 13, 2013

(65) Prior Publication Data
US 2013/0328666 A1    Dec. 12, 2013

Related U.S. Application Data

(63) Continuation of application No. 12/229,964, filed on Aug. 28, 2008.

(51) Int. Cl.
*G06K 7/10*           (2006.01)
*G02B 6/38*           (2006.01)
(Continued)

(52) U.S. Cl.
CPC .......... *G06K 7/10366* (2013.01); *G02B 6/3878* (2013.01); *G02B 6/3895* (2013.01);
(Continued)

(58) Field of Classification Search
CPC ................................................. G06K 7/10366
USPC ........................................... 398/25, 116, 117
See application file for complete search history.

(56) References Cited

U.S. PATENT DOCUMENTS 3,052,842 A    9/1962   Frohman, Jr. et al.
3,609,742 A    9/1971   Burdick
(Continued)

FOREIGN PATENT DOCUMENTS

CN    101095152 A    12/2007
CN    101268497 A    9/2008
(Continued)

OTHER PUBLICATIONS

Office Action for Chinese patent application 200980105750.2 mailed Aug. 31, 2012, 25 pages.
(Continued)

*Primary Examiner* — Nathan Curs

(57) ABSTRACT

Radio-frequency identification-(RFID)-based systems and methods for collecting telecommunications information is disclosed. The methods include storing transceiver information in a transceiver and connector information in an optical fiber connector, and then operably connecting the connector to the transceiver. The connection results in an electrical connection that allows the transceiver information to be communicated to the connector. The connector has a RFID tag that generates a connector RFID-tag signal that includes the connector information and the transceiver information. When electronics equipment are connected to the transceiver, electronics-equipment information is passed through the transceiver to the connector so that the electronics-equipment information can be included in the connector RFID-tag signal. The transceiver may also include a transceiver RFID tag that can receive connector information and electronics-equipment information and generate a transceiver RFID-tag signal that includes connector, transceiver and/or electronics-equipment information. A Portable test device is also used to connect to the transceiver or the electronics equipment to effectuate the transfer of transceiver and/or electronics-equipment information.

27 Claims, 11 Drawing Sheets

(51) Int. Cl.
*G02B 6/42* (2006.01)
*H04L 12/24* (2006.01)
*H04L 12/26* (2006.01)

(52) U.S. Cl.
CPC ............ *G02B6/4246* (2013.01); *G02B 6/4292* (2013.01); *H04L 41/22* (2013.01); *H04L 43/0823* (2013.01); *H04L 43/0829* (2013.01)

(56) References Cited

U.S. PATENT DOCUMENTS

| | | |
|---|---|---|
| 3,771,098 A | 11/1973 | Dempsey |
| 3,931,574 A | 1/1976 | Curtis, Jr. et al. |
| 3,942,859 A | 3/1976 | Korodi |
| 4,019,128 A | 4/1977 | Chebowski |
| 4,200,862 A | 4/1980 | Campbell et al. |
| 4,365,238 A | 12/1982 | Kollin |
| 4,418,333 A | 11/1983 | Schwarzbach et al. |
| 4,578,636 A | 3/1986 | Bakke et al. |
| 4,626,633 A | 12/1986 | Ruehl et al. |
| 4,630,886 A | 12/1986 | Lauriello et al. |
| 4,889,977 A | 12/1989 | Haydon et al. |
| 4,915,639 A | 4/1990 | Cohn et al. |
| 4,924,213 A | 5/1990 | Decho et al. |
| 4,937,529 A | 6/1990 | O'Toole, III et al. |
| 4,968,929 A | 11/1990 | Hauck et al. |
| 4,978,317 A | 12/1990 | Pocrass |
| 5,081,627 A | 1/1992 | Yu |
| 5,185,570 A | 2/1993 | Fitzpatrick |
| 5,199,093 A | 3/1993 | Longhurst |
| 5,222,164 A | 6/1993 | Bass, Sr. et al. |
| 5,244,409 A | 9/1993 | Guss, III et al. |
| 5,265,187 A | 11/1993 | Morin et al. |
| 5,297,015 A | 3/1994 | Miyazaki et al. |
| 5,305,405 A | 4/1994 | Emmons et al. |
| 5,337,400 A | 8/1994 | Morin et al. |
| 5,353,367 A | 10/1994 | Czosnowski et al. |
| 5,394,503 A | 2/1995 | Dietz, Jr. et al. |
| 5,418,334 A | 5/1995 | Williams |
| 5,448,675 A | 9/1995 | Leone et al. |
| 5,461,693 A | 10/1995 | Pimpinella |
| 5,473,715 A | 12/1995 | Schofield et al. |
| 5,483,467 A | 1/1996 | Krupka et al. |
| 5,528,222 A | 6/1996 | Moskowitz et al. |
| 5,588,873 A | 12/1996 | Hamai et al. |
| 5,601,451 A | 2/1997 | Driones et al. |
| 5,613,873 A | 3/1997 | Bell, Jr. |
| 5,638,818 A | 6/1997 | Diab et al. |
| 5,645,440 A | 7/1997 | Tobler et al. |
| 5,660,567 A | 8/1997 | Nierlich et al. |
| 5,666,453 A | 9/1997 | Dannenmann |
| 5,685,737 A | 11/1997 | Morin et al. |
| 5,692,925 A | 12/1997 | Bogese, II |
| 5,700,157 A | 12/1997 | Chung |
| 5,704,802 A | 1/1998 | Loudermilk |
| 5,741,152 A | 4/1998 | Boutros |
| 5,764,043 A | 6/1998 | Czosnowski et al. |
| 5,782,757 A | 7/1998 | Diab et al. |
| 5,797,767 A | 8/1998 | Schell |
| 5,821,510 A | 10/1998 | Cohen et al. |
| 5,842,045 A | 11/1998 | Nakamura |
| 5,847,557 A | 12/1998 | Fincher et al. |
| 5,854,824 A | 12/1998 | Bengal et al. |
| 5,876,239 A | 3/1999 | Morin et al. |
| 5,876,240 A | 3/1999 | Derstine et al. |
| 5,885,100 A | 3/1999 | Talend et al. |
| 5,910,776 A | 6/1999 | Black et al. |
| 5,914,862 A | 6/1999 | Ferguson et al. |
| 5,915,993 A | 6/1999 | Belopolsky et al. |
| 5,924,889 A | 7/1999 | Wang |
| 5,934,925 A | 8/1999 | Tobler et al. |
| 5,984,731 A | 11/1999 | Laity |
| 5,995,006 A | 11/1999 | Walsh |
| 5,995,855 A | 11/1999 | Kiani et al. |
| 5,999,400 A | 12/1999 | Belopolsky et al. |
| 6,002,331 A | 12/1999 | Laor et al. |
| 6,025,725 A | 2/2000 | Gershenfeld et al. |
| 6,068,627 A | 5/2000 | Orszulak et al. |
| 6,095,851 A | 8/2000 | Laity et al. |
| 6,095,869 A | 8/2000 | Wang |
| 6,100,804 A | 8/2000 | Brady et al. |
| 6,102,741 A | 8/2000 | Boutros et al. |
| 6,113,422 A | 9/2000 | Somerville et al. |
| 6,116,946 A | 9/2000 | Lewis et al. |
| 6,116,962 A | 9/2000 | Laity |
| 6,118,379 A | 9/2000 | Kodukula et al. |
| 6,120,318 A | 9/2000 | Reed et al. |
| 6,126,610 A | 10/2000 | Rich et al. |
| 6,127,929 A | 10/2000 | Roz |
| 6,133,835 A | 10/2000 | De Leeuw et al. |
| 6,142,822 A | 11/2000 | Wu |
| 6,152,762 A | 11/2000 | Marshall et al. |
| 6,164,551 A | 12/2000 | Altwasser et al. |
| 6,174,194 B1 | 1/2001 | Bleicher et al. |
| 6,217,371 B1 | 4/2001 | Wu |
| 6,222,908 B1 | 4/2001 | Bartolutti et al. |
| 6,222,975 B1 | 4/2001 | Gilbert et al. |
| 6,224,417 B1 | 5/2001 | Belopolsky et al. |
| 6,227,911 B1 | 5/2001 | Boutros et al. |
| 6,232,870 B1 | 5/2001 | Garber et al. |
| 6,234,830 B1 | 5/2001 | Ensz et al. |
| 6,241,550 B1 | 6/2001 | Laity et al. |
| 6,243,654 B1 | 6/2001 | Johnson et al. |
| 6,256,523 B1 | 7/2001 | Diab et al. |
| 6,280,213 B1 | 8/2001 | Tobler et al. |
| 6,285,293 B1 | 9/2001 | German et al. |
| 6,298,255 B1 | 10/2001 | Cordero et al. |
| 6,319,051 B1 | 11/2001 | Chang et al. |
| 6,319,062 B1 | 11/2001 | Ma et al. |
| 6,325,664 B1 | 12/2001 | Someda et al. |
| 6,330,307 B1 | 12/2001 | Bloch et al. |
| 6,349,228 B1 | 2/2002 | Kiani et al. |
| 6,350,148 B1 | 2/2002 | Bartolutti et al. |
| 6,352,446 B2 | 3/2002 | Ezawa et al. |
| 6,354,884 B1 | 3/2002 | Yeh et al. |
| 6,368,155 B1 | 4/2002 | Bassler et al. |
| 6,375,362 B1 | 4/2002 | Heiles et al. |
| 6,377,203 B1 | 4/2002 | Doany |
| 6,378,111 B1 | 4/2002 | Brenner et al. |
| 6,402,743 B1 | 6/2002 | Orszulak et al. |
| 6,409,530 B1 | 6/2002 | Zhao et al. |
| 6,424,263 B1 | 7/2002 | Lee et al. |
| 6,424,315 B1 | 7/2002 | Glenn et al. |
| 6,424,710 B1 | 7/2002 | Bartolutti et al. |
| 6,428,361 B1 | 8/2002 | Imschweiler et al. |
| 6,431,906 B1 | 8/2002 | Belopolsky |
| 6,439,922 B1 | 8/2002 | Laurer et al. |
| 6,456,768 B1 | 9/2002 | Boncek et al. |
| 6,457,993 B1 | 10/2002 | Espenshade |
| 6,464,533 B1 | 10/2002 | Ma et al. |
| 6,469,404 B1 | 10/2002 | Pohjola |
| 6,478,610 B1 | 11/2002 | Zhou et al. |
| 6,478,611 B1 | 11/2002 | Hyland |
| 6,496,113 B2 | 12/2002 | Lee et al. |
| 6,496,382 B1 | 12/2002 | Ferguson et al. |
| 6,499,861 B1 | 12/2002 | German et al. |
| 6,522,308 B1 | 2/2003 | Mathieu |
| 6,522,737 B1 | 2/2003 | Bartolutti et al. |
| 6,541,756 B2 | 4/2003 | Schulz et al. |
| 6,543,940 B2 | 4/2003 | Chu |
| 6,556,761 B1 | 4/2003 | Jennings et al. |
| 6,574,586 B1 | 6/2003 | David et al. |
| 6,577,243 B1 | 6/2003 | Dannenmann et al. |
| 6,580,086 B1 | 6/2003 | Schulz et al. |
| 6,618,022 B2 | 9/2003 | Harvey |
| 6,655,988 B1 | 12/2003 | Simmons et al. |
| 6,663,417 B1 | 12/2003 | Hung |
| 6,684,179 B1 | 1/2004 | David |
| 6,685,701 B2 | 2/2004 | Orszulak et al. |
| 6,688,908 B2 | 2/2004 | Wallace |
| 6,688,910 B1 | 2/2004 | Macauley |
| 6,693,513 B2 | 2/2004 | Tuttle |
| 6,696,952 B2 | 2/2004 | Zirbes |
| 6,725,177 B2 | 4/2004 | David et al. |

(56) References Cited

U.S. PATENT DOCUMENTS

| | | |
|---|---|---|
| 6,729,910 B2 | 5/2004 | Fuller |
| 6,733,186 B2 | 5/2004 | Pfleger |
| 6,750,643 B2 | 6/2004 | Hwang et al. |
| 6,773,298 B2 | 8/2004 | Gutierrez et al. |
| 6,773,306 B2 | 8/2004 | Plishner |
| 6,784,802 B1 | 8/2004 | Stanescu |
| 6,798,956 B2 | 9/2004 | Morrison |
| 6,808,116 B1 | 10/2004 | Eslambolchi et al. |
| 6,829,427 B1 | 12/2004 | Becker |
| 6,831,443 B2 | 12/2004 | Liu |
| 6,846,115 B1 | 1/2005 | Shang et al. |
| 6,847,856 B1 | 1/2005 | Bohannon |
| 6,857,897 B2 | 2/2005 | Conn |
| 6,866,424 B2 | 3/2005 | Tanaka et al. |
| 6,871,156 B2 | 3/2005 | Wallace et al. |
| 6,881,096 B2 | 4/2005 | Brown et al. |
| 6,888,996 B2 | 5/2005 | Hwang et al. |
| 6,890,197 B2 | 5/2005 | Liebenow |
| 6,896,542 B2 | 5/2005 | Chang |
| 6,898,368 B2 | 5/2005 | Colombo et al. |
| 6,900,629 B2 | 5/2005 | Hwang et al. |
| 6,902,433 B1 | 6/2005 | Hashimoto et al. |
| 6,910,917 B2 | 6/2005 | Chen |
| 6,913,481 B2 | 7/2005 | Marshall et al. |
| 6,915,050 B2 | 7/2005 | Koyasu et al. |
| 6,917,763 B1 | 7/2005 | Au et al. |
| 6,921,284 B2 | 7/2005 | Sirichai et al. |
| 6,923,689 B2 | 8/2005 | Xue et al. |
| 6,924,781 B1 | 8/2005 | Gelbman |
| 6,924,997 B2 | 8/2005 | Chen et al. |
| 6,961,675 B2 | 11/2005 | David |
| 6,968,994 B1 | 11/2005 | Ashwood Smith |
| 6,971,895 B2 | 12/2005 | Sago et al. |
| 6,973,243 B2 | 12/2005 | Koyasu et al. |
| 6,975,242 B2 | 12/2005 | Dannenmann et al. |
| 6,979,223 B2 | 12/2005 | Chen |
| 6,992,567 B2 | 1/2006 | Cole et al. |
| 6,999,028 B2 | 2/2006 | Egbert |
| 7,014,100 B2 | 3/2006 | Zierolf |
| 7,014,500 B2 | 3/2006 | Belesimo |
| 7,016,726 B1 | 3/2006 | Picardo et al. |
| 7,018,242 B2 | 3/2006 | Brown et al. |
| 7,024,089 B2 | 4/2006 | Weinert et al. |
| 7,027,704 B2 | 4/2006 | Frohlich et al. |
| 7,028,087 B2 | 4/2006 | Caveney |
| 7,028,202 B2 | 4/2006 | Long et al. |
| 7,038,135 B1 | 5/2006 | Chan et al. |
| 7,044,949 B2 | 5/2006 | Orszulak et al. |
| 7,046,899 B2 | 5/2006 | Colombo et al. |
| 7,062,139 B2 | 6/2006 | Shang |
| 7,068,912 B1 | 6/2006 | Becker |
| 7,069,345 B2 | 6/2006 | Shteyn |
| 7,080,945 B2 | 7/2006 | Colombo et al. |
| 7,081,808 B2 | 7/2006 | Colombo et al. |
| 7,096,077 B2 | 8/2006 | Price et al. |
| 7,102,520 B2 | 9/2006 | Liu et al. |
| 7,123,810 B2 | 10/2006 | Parrish |
| 7,132,641 B2 | 11/2006 | Schulz et al. |
| 7,140,782 B2 | 11/2006 | Frohlich et al. |
| 7,151,455 B2 | 12/2006 | Lindsay et al. |
| 7,158,031 B2 | 1/2007 | Tuttle |
| 7,158,033 B2 | 1/2007 | Forster |
| 7,160,143 B2 | 1/2007 | David et al. |
| 7,165,728 B2 | 1/2007 | Durrant et al. |
| 7,168,975 B2 | 1/2007 | Kuo |
| 7,170,393 B2 | 1/2007 | Martin |
| 7,173,345 B2 | 2/2007 | Brandt et al. |
| 7,193,422 B2 | 3/2007 | Velleca et al. |
| 7,194,180 B2 | 3/2007 | Becker |
| 7,205,898 B2 | 4/2007 | Dixon et al. |
| 7,207,846 B2 | 4/2007 | Caveney et al. |
| 7,210,858 B2 | 5/2007 | Sago et al |
| 7,217,152 B1 | 5/2007 | Xin et al. |
| 7,221,277 B2 | 5/2007 | Caron et al. |
| 7,221,284 B2 | 5/2007 | Scherer et al. |
| 7,224,278 B2 | 5/2007 | Phaneuf et al. |
| 7,224,280 B2 | 5/2007 | Ferguson et al. |
| 7,226,217 B1 | 6/2007 | Benton et al. |
| 7,233,250 B2 | 6/2007 | Forster |
| 7,234,944 B2 | 6/2007 | Nordin et al. |
| 7,243,837 B2 | 7/2007 | Durrant et al. |
| 7,247,046 B1 | 7/2007 | Wu |
| 7,252,538 B2 | 8/2007 | Garrett et al. |
| 7,253,735 B2 | 8/2007 | Gengel et al. |
| 7,265,674 B2 | 9/2007 | Tuttle |
| 7,275,970 B2 | 10/2007 | Hoshina |
| 7,285,007 B2 | 10/2007 | Barna |
| 7,294,786 B2 | 11/2007 | Aldereguia et al. |
| 7,297,018 B2 | 11/2007 | Caveney et al. |
| 7,297,028 B2 | 11/2007 | Daikuhara et al. |
| 7,298,266 B2 | 11/2007 | Forster |
| 7,298,330 B2 | 11/2007 | Forster et al. |
| 7,298,946 B2 | 11/2007 | Mueller |
| 7,306,489 B2 | 12/2007 | Werthman et al. |
| 7,307,408 B2 | 12/2007 | Porcu et al. |
| 7,318,744 B2 | 1/2008 | Kuo |
| 7,319,397 B2 | 1/2008 | Chung et al. |
| 7,327,278 B2 | 2/2008 | Dannenmann et al. |
| 7,336,883 B2 | 2/2008 | Scholtz |
| 7,349,605 B2 | 3/2008 | Noonan et al. |
| 7,352,285 B2 | 4/2008 | Sakama et al. |
| 7,352,289 B1 | 4/2008 | Harris |
| 7,354,298 B2 | 4/2008 | James |
| 7,356,208 B2 | 4/2008 | Becker |
| 7,411,500 B2 | 8/2008 | Hamerly et al. |
| 7,468,669 B1 | 12/2008 | Beck et al. |
| 7,504,945 B2 | 3/2009 | Cox et al. |
| 7,757,936 B2 | 7/2010 | Aguren et al. |
| 7,760,094 B1 | 7/2010 | Kozischek et al. |
| 7,772,975 B2 | 8/2010 | Downie et al. |
| 7,782,202 B2 | 8/2010 | Downie et al. |
| 2001/0008390 A1 | 7/2001 | Berquist et al. |
| 2001/0027055 A1 | 10/2001 | Laity et al. |
| 2001/0039140 A1 | 11/2001 | Fasold et al. |
| 2002/0071394 A1 | 6/2002 | Koziy et al. |
| 2002/0086584 A1 | 7/2002 | Liu |
| 2002/0090858 A1 | 7/2002 | Caveney |
| 2002/0092347 A1 | 7/2002 | Niekerk et al. |
| 2003/0021580 A1 | 1/2003 | Matthews |
| 2003/0061393 A1 | 3/2003 | Steegmans et al. |
| 2003/0100217 A1 | 5/2003 | Wu |
| 2003/0100218 A1 | 5/2003 | Tsai et al. |
| 2003/0148654 A1 | 8/2003 | Kan |
| 2003/0154273 A1 | 8/2003 | Caveney |
| 2003/0154276 A1 | 8/2003 | Caveney |
| 2003/0162414 A1 | 8/2003 | Schulz et al. |
| 2003/0211782 A1 | 11/2003 | Esparaz et al. |
| 2004/0041714 A1 | 3/2004 | Forster |
| 2004/0052471 A1 | 3/2004 | Colombo et al. |
| 2004/0114879 A1 | 6/2004 | Hiereth et al. |
| 2004/0117515 A1 | 6/2004 | Sago et al. |
| 2004/0123998 A1 | 7/2004 | Berglund et al. |
| 2004/0149736 A1 | 8/2004 | Clothier |
| 2004/0184747 A1 | 9/2004 | Koyasu et al. |
| 2004/0253874 A1 | 12/2004 | Plishner |
| 2005/0032415 A1 | 2/2005 | Sakamoto |
| 2005/0040241 A1* | 2/2005 | Raskar .......................... 235/492 |
| 2005/0052174 A1 | 3/2005 | Angelo et al. |
| 2005/0052287 A1 | 3/2005 | Whitesmith et al. |
| 2005/0068179 A1 | 3/2005 | Roesner |
| 2005/0076982 A1 | 4/2005 | Metcalf et al. |
| 2005/0093677 A1 | 5/2005 | Forster et al. |
| 2005/0098630 A1 | 5/2005 | Nakazawa |
| 2005/0111491 A1 | 5/2005 | Caveney |
| 2005/0215119 A1 | 9/2005 | Kaneko |
| 2005/0219050 A1 | 10/2005 | Martin |
| 2005/0224585 A1 | 10/2005 | Durrant et al. |
| 2005/0231325 A1 | 10/2005 | Durrant et al. |
| 2005/0232636 A1 | 10/2005 | Durrant et al. |
| 2005/0259930 A1 | 11/2005 | Elkins, II et al. |
| 2005/0260884 A1 | 11/2005 | Yueh |
| 2005/0280511 A1 | 12/2005 | Yokoyama et al. |
| 2006/0039136 A1 | 2/2006 | Probasco et al. |
| 2006/0042984 A1 | 3/2006 | Suzuki |

(56) References Cited

U.S. PATENT DOCUMENTS

| | | | |
|---|---|---|---|
| 2006/0044148 A1 | 3/2006 | Daniels et al. | |
| 2006/0091207 A1 | 5/2006 | Chang | |
| 2006/0148279 A1 | 7/2006 | German et al. | |
| 2006/0153517 A1 | 7/2006 | Reagan et al. | |
| 2006/0166546 A1 | 7/2006 | Ashizawa et al. | |
| 2006/0206246 A1 | 9/2006 | Walker | |
| 2006/0232419 A1 | 10/2006 | Tomioka et al. | |
| 2006/0233506 A1 | 10/2006 | Noonan et al. | |
| 2006/0257092 A1 | 11/2006 | Lu et al. | |
| 2006/0267778 A1 | 11/2006 | Gengel et al. | |
| 2006/0275007 A1 | 12/2006 | Livingston et al. | |
| 2006/0282529 A1 | 12/2006 | Nordin | |
| 2006/0286856 A1 | 12/2006 | Sakamoto | |
| 2006/0292311 A1 | 12/2006 | Kilburn et al. | |
| 2007/0013487 A1 | 1/2007 | Scholtz et al. | |
| 2007/0015410 A1 | 1/2007 | Siemon et al. | |
| 2007/0023525 A1 | 2/2007 | Son et al. | |
| 2007/0032124 A1 | 2/2007 | Nordin et al. | |
| 2007/0055470 A1 | 3/2007 | Pietrzyk et al. | |
| 2007/0059975 A1 | 3/2007 | Walsh | |
| 2007/0116411 A1* | 5/2007 | Benton et al. | 385/53 |
| 2007/0117450 A1 | 5/2007 | Truxes | |
| 2007/0120684 A1 | 5/2007 | Utaka et al. | |
| 2007/0152828 A1 | 7/2007 | Mohalik | |
| 2007/0155223 A1 | 7/2007 | Huang et al. | |
| 2007/0176745 A1 | 8/2007 | Gibson et al. | |
| 2007/0196058 A1 | 8/2007 | Lee et al. | |
| 2007/0205897 A1 | 9/2007 | Forster | |
| 2007/0216534 A1 | 9/2007 | Ferguson et al. | |
| 2007/0236355 A1 | 10/2007 | Flaster et al. | |
| 2007/0238343 A1 | 10/2007 | Velleca et al. | |
| 2007/0241439 A1 | 10/2007 | Chung et al. | |
| 2007/0247284 A1 | 10/2007 | Martin et al. | |
| 2008/0003867 A1 | 1/2008 | Wu | |
| 2008/0021766 A1 | 1/2008 | McElwaine et al. | |
| 2008/0032546 A1 | 2/2008 | Xuan et al. | |
| 2008/0045075 A1 | 2/2008 | Caveney et al. | |
| 2008/0090451 A1 | 4/2008 | Feldman | |
| 2008/0100456 A1 | 5/2008 | Downie et al. | |
| 2008/0100467 A1 | 5/2008 | Downie et al. | |
| 2008/0106415 A1 | 5/2008 | Sellew et al. | |
| 2008/0139306 A1 | 6/2008 | Lutnick et al. | |
| 2008/0220721 A1 | 9/2008 | Downie et al. | |
| 2008/0240724 A1 | 10/2008 | Aguren | |
| 2009/0032577 A1 | 2/2009 | Aguren et al. | |
| 2009/0079544 A1* | 3/2009 | Noble | 340/10.1 |
| 2009/0096581 A1 | 4/2009 | Macauley et al. | |
| 2009/0224039 A1 | 9/2009 | Hause et al. | |
| 2009/0240945 A1* | 9/2009 | Aronson | 713/176 |
| 2009/0261955 A1* | 10/2009 | Moore et al. | 340/10.42 |
| 2010/0080554 A1 | 4/2010 | Aguren | |

FOREIGN PATENT DOCUMENTS

| | | |
|---|---|---|
| DE | 19841738 A1 | 3/2000 |
| DE | 19920452 A1 | 11/2000 |
| DE | 10244304 B3 | 3/2004 |
| DE | 10249414 A1 | 5/2004 |
| EP | 1455550 A2 | 9/2004 |
| EP | 1467232 A1 | 10/2004 |
| EP | 1686025 A2 | 8/2006 |
| EP | 1696680 A1 | 8/2006 |
| GB | 2347508 A | 9/2000 |
| GB | 2371211 A | 7/2002 |
| JP | 03242795 A | 10/1991 |
| JP | 04039483 A | 2/1992 |
| JP | 04174406 A | 6/1992 |
| JP | 08191257 A | 7/1996 |
| JP | 2001069625 A | 3/2001 |
| JP | 2001099946 A | 4/2001 |
| JP | 2002264617 A | 9/2002 |
| JP | 2003148653 A | 5/2003 |
| JP | 2003172827 A | 6/2003 |
| JP | 2003229215 A | 8/2003 |
| JP | 2003284213 A | 10/2003 |
| JP | 2004038583 A | 2/2004 |
| JP | 2004039389 A | 2/2004 |
| JP | 2004142500 A | 5/2004 |
| JP | 2004245963 A | 9/2004 |
| JP | 2004247090 A | 9/2004 |
| JP | 2004247134 A | 9/2004 |
| JP | 2004264901 A | 9/2004 |
| JP | 2004265624 A | 9/2004 |
| JP | 2004265860 A | 9/2004 |
| JP | 2004265861 A | 9/2004 |
| JP | 2004266886 A | 9/2004 |
| JP | 2004317737 A | 11/2004 |
| JP | 2004349184 A | 12/2004 |
| JP | 2004361896 A | 12/2004 |
| JP | 2005018175 A | 1/2005 |
| JP | 2005033857 A | 2/2005 |
| JP | 2005050581 A | 2/2005 |
| JP | 2005084162 A | 3/2005 |
| JP | 2005086901 A | 3/2005 |
| JP | 2005087135 A | 4/2005 |
| JP | 2005092107 A | 4/2005 |
| JP | 2005134125 A | 5/2005 |
| JP | 2005216698 A | 8/2005 |
| JP | 2005234620 A | 9/2005 |
| JP | 2005302403 A | 10/2005 |
| JP | 2005315980 A | 11/2005 |
| JP | 2005339983 A | 12/2005 |
| JP | 2005341738 A | 12/2005 |
| JP | 2006054118 A | 2/2006 |
| JP | 2006101630 A | 4/2006 |
| JP | 2006245983 A | 9/2006 |
| JP | 2006279650 A | 10/2006 |
| JP | 2007087849 A | 4/2007 |
| JP | 2007088957 A | 4/2007 |
| JP | 2007158993 A | 6/2007 |
| JP | 2007189774 A | 7/2007 |
| JP | 2007221400 A | 8/2007 |
| WO | 03098175 A1 | 11/2003 |
| WO | 2004030154 A2 | 4/2004 |
| WO | 2006063023 A1 | 6/2006 |
| WO | 2007033294 A2 | 3/2007 |
| WO | 2008000656 A1 | 1/2008 |
| WO | 2008054742 A2 | 5/2008 |
| WO | 2008075123 A1 | 6/2008 |
| WO | 2008076235 A1 | 6/2008 |
| WO | 2008112169 A1 | 9/2008 |

OTHER PUBLICATIONS

Decision of rejection for Japanese patent application 2009-541316 issued Aug. 7, 2012, 10 pages.

Official Letter for Taiwanese patent application 098134450 mailed Oct. 3, 2012, 8 pages.

European Search Report for application 07867312.6 mailed Sep. 12, 2012, 12 pages.

European Search Report for application 07867314.2 mailed Sep. 12, 2012, 11 pages.

First Office Action for Chinese Patent application 200980131993.3 mailed Feb. 1, 2013, 8 pages.

First Office Action for Chinese Patent application 200980139124.5 mailed Mar. 4, 2013, 24 pages.

Examination Report for European Patent Application 09701815.4 mailed Mar. 21, 2013, 4 pages.

Non-final Office Action for U.S. Appl. No. 13/588,079 mailed May 14, 2013, 13 pages.

Non-final Office Action for U.S. Appl. No. 12/229,964 mailed Aug. 5, 2013, 10 pages.

First Office Action for Chinese patent application 200780050180.2 mailed Nov. 15, 2011, 11 pages.

Third Office Action for Chinese patent application 200780050180.2 mailed Oct. 25, 2012, 7 pages.

Second Office Action for Chinese patent application 200980105750.2 mailed May 9, 2013, 5 pages.

First Office Action for Chinese patent application 200980144859.7 mailed Jun. 20, 2013, 9 pages.

(56) References Cited

OTHER PUBLICATIONS

Examination Report for European Patent Application 09701815.4 mailed Apr. 14, 2011, 6 pages.
International Search Report and Written Opinion for PCT/US2007/025136 mailed Jun. 2, 2008, 13 pages.
International Search Report and Written Opinion for PCT/US2009/060151 mailed Dec. 17, 2009, 14 pages.
International Search Report and Written Opinion for PCT/US2009/031099 mailed Apr. 1, 2009, 15 pages.
International Search Report and Written Opinion for PCT/US 09/04087 mailed Aug. 27, 2009, 10 pages.
International Search Report and Written Opinion for PCT/US2009/004566 mailed Feb. 1, 2010, 19 pages.
Japanese Office Action for patent application 2009-541316 mailed Jan. 10, 2012, 10 pages.
Examination Report for European patent application 09740228.3-2415 mailed Mar. 13, 2012, 12 pages.
Examination Report for European patent application 09701815.4 mailed Apr. 3, 2012, 4 pages.
Examination Report for European patent application 07853287.6 mailed May 15, 2012, 10 pages.
Examination Report for European Patent application 09789099.0 mailed Jun. 14, 2012, 7 pages.
Office Action for Chinese patent application 200780050180.2 mailed Jul. 20, 2012, 8 pages.
Wilson, Brian et al., "Multiwavelength Optical Networking Management and Control," Journal of Lightwave Technology, IEEE Dec. 1, 2000, vol. 18, No. 12, pp. 2038-2057.
Examination Report for European patent application 07867312.6 mailed Sep. 16, 2013, 6 pages.
Examination Report for European patent application 07867314.2 mailed Sep. 16, 2013, 5 pages.
Second Office Action for Chinese patent application 200980139124.5 mailed Sep. 12, 2013, 7 pages.
Notice of Allowance for U.S. Appl. No. 12/229,964 mailed Mar. 7, 2014, 5 pages.
Advisory Action for U.S. Appl. No. 13/588,079 mailed Jan. 13, 2014, 4 pages.
Third Office Action for Chinese patent application 200980139124.5 mailed Mar. 11, 2014, 19 pages.
Third Office Action for Chinese patent application 200980105750.2 mailed Nov. 14, 2013, 8 pages.
Second Office Action for Chinese patent application 200980131993.3 mailed Oct. 12, 2013, 13 pages.
Final Office Action for U.S. Appl. No. 13/588,079 mailed Nov. 7, 2013, 16 pages.
Translation of Third Office Action for Chinese patent application 200980131993.3 mailed Apr. 30, 2014, 4 pages.

* cited by examiner

RFID-BASED SYSTEMS AND METHODS FOR COLLECTING TELECOMMUNICATIONS NETWORK INFORMATION

PRIORITY APPLICATION

This application is a continuation application of U.S. patent application Ser. No. 12/229,964 filed on Aug. 28, 2008, the content of which is relied upon and incorporated herein by reference in its entirety, and the benefit of priority under 35 U.S.C. §120 is hereby claimed.

FIELD OF THE INVENTION

The present invention relates generally to the use of radio-frequency identification (RFID) systems, and in particular is related to RFID-based systems and methods for collecting information from a telecommunications network.

BACKGROUND OF THE INVENTION

Typical telecommunications systems include telecommunications data centers that have a large number of optical and electrical cable connections that operably connect various types of network equipment and components. Examples of network equipment and components include electrically powered (active) units such as optical transceivers, servers, switches and routers, and unpowered (passive) units such as fanout boxes and patch panels (collectively, "network equipment"). This network equipment is often installed within cabinets in standard (e.g., 19") equipment racks. Each piece of equipment typically provides one or more adapters where optical or electrical patch cables can be physically connected to the equipment. These patch cables are generally routed to network equipment located in the same cabinet or to another cabinet. This network equipment is, in turn, connected to other network equipment.

A common problem in telecommunications networks is determining the most current configuration of all the optical and electrical links among all the network equipment. The "physical layer" configuration can be completely determined if the physical locations of all connected patch cable connectors on installed network equipment are known. Information about the physical location and orientation of the adapters and their parent patch panels in data center cabinets is presently manually recorded and added to the network management software database after the adapters and patch panels are installed. However, this process is labor-intensive and prone to errors. Additionally, any changes made to the physical configuration of any network equipment must be followed up with corresponding changes to the network management software database, which delays providing the most up-to-date information about the network configuration. Furthermore, errors from manual recording and entry of configuration data tend to accumulate over time, reducing the trustworthiness of the network management software database.

Another problem in telecommunications data center management is determining or otherwise extracting identity and diagnostic information from network equipment, particularly for that equipment that resides "upstream" of the physical layer. For example, small form-factor pluggable (SFP) optical transceivers ("transceivers") are used extensively in telecommunications networks. SFP transceivers convert optical signals to electrical signals (O/E conversion) and vice versa (E/O conversion). Such transceivers provide an interface between electronics-based devices (e.g., switches, routers, server blades, etc.) and fiber optic cables (e.g., jumper cables). Likewise, SFP transceivers provide an interface between optical devices (e.g., light sources) and electronic devices such as electrical cables, detectors, etc.

SFP transceivers have a number of important operational (diagnostic) parameters such as the data rate (e.g., 4.25 Gb/s, 10 Gb/s, etc.), temperature, current, voltage, bit-error rate, security status, connectivity information/status, etc. SFP transceivers also have a number of important identity parameters, such as manufacturer, serial number, location, install date, etc. Consequently, SFP transceivers need to be monitored by field technicians, who need to obtain identity and diagnostic information about the transceivers in order to assess the network status and to diagnose network problems.

In addition to SFP transceiver identity and diagnostic information, it would also be desirable to obtain like information from the electronics equipment to which the SFP transceivers are connected or hosted by, such as MAC address, IP address, and data from other network layers. Such information resides "upstream" of the physical layer and so is not otherwise readily accessible to field technicians that monitor the physical layer.

SUMMARY OF THE INVENTION

A first aspect of the invention is a radio-frequency identification (RFID)-based system for collecting information from a telecommunications network. The system includes an optical transceiver having transceiver circuitry configured to perform at least one of storing, receiving and communicating information. The system also includes an optical fiber connector having a connector RFID tag configured to store information and communicate with the transceiver circuitry when electrically connected to the transceiver. The connector RFID tag is adapted to generate a connector RFID-tag signal (ST1) that contains information stored in the connector ("connector-stored information"). The system also includes an RF reader adapted to generate a reader signal (SR) that elicits the connector RFID-tag signal and that is configured to store information contained in the connector RFID-tag signal.

A second aspect of the invention is a RFID-based system for collecting information from a telecommunications network. The system includes an optical transceiver having a transceiver circuitry configured to perform at least one of storing, receiving and communicating information, including transceiver information. The system also includes electronics equipment operably connected to the transceiver. The electronics equipment contains electronics-equipment information (e.g., stored in a memory unit therein). The electronics equipment and transceiver are configured to communicate the electronics-equipment information to the transceiver. The transceiver includes a transceiver RFID tag operably supported by the transceiver. The transceiver RFID tag is adapted to generate a transceiver RFID-tag signal that includes the transceiver information and/or the electronics-equipment information. The system also includes a RF reader adapted to produce a reader signal that elicits the transceiver RFID-tag signal and that is configured to store information contained in the transceiver RFID-tag signal.

A third aspect of the invention is information-collection system for collecting information from a telecommunications network. The system includes a transceiver having transceiver circuitry configured to perform at least one of storing, receiving and communicating information, including transceiver information. The system also includes electronics equipment operably connected to the transceiver and that contains electronics-equipment information and a first processor that operably supports information processing software. The electronics equipment and transceiver are configured to communicate the transceiver information and the electronic information to the first processor, which forms processed information. The system includes a database having a second processor in operable communication with the first processor and that operably supports the information processing software. The processed information from the first processor is preferably communicated to the second processor for further processing.

A fourth aspect of the invention is a method of collecting information from a telecommunications network that includes an optical fiber connector and a transceiver. The method includes storing transceiver information in the transceiver, and communicating the transceiver information to the optical fiber connector when the transceiver and optical fiber connector are operably coupled. The method also includes, using a RFID tag in the optical fiber connector to transmit to a RF reader a connector RFID-tag signal that includes the transceiver information.

A fifth aspect of the invention is a method of collecting information from a telecommunications network that includes a transceiver. The method includes storing transceiver information in the transceiver, and then using a RFID tag in the transceiver to transmit to a RF reader a transceiver RFID-tag signal that includes the transceiver information.

A sixth aspect of the invention is a method of collecting information from a telecommunications network that includes a transceiver having a port that connects to an optical fiber connector. The method includes storing transceiver information in transceiver circuitry within the transceiver. The method further includes connecting a portable test device having a memory unit and a RF reader attached to the memory unit to form an electrical connection with the transceiver circuitry. The method also includes communicating the transceiver information from the transceiver circuitry to the memory unit and then to the RF reader.

A seventh aspect of the invention is a method of collecting electronics-equipment information stored in a memory chip of electronics equipment of a telecommunications network. The method includes connecting a portable test device having a memory unit and a RF reader attached to the memory unit to form an electrical connection with the memory chip. The method also includes communicating the electronics-equipment information from the memory chip to the memory unit and then to the RF reader.

An eighth aspect of the invention is a method of collecting information from a telecommunications network that includes a transceiver having a port that connects to an optical fiber connector. The method includes storing transceiver information in transceiver circuitry within the transceiver, and communicating the transceiver information to electronics equipment that includes stored electronics-equipment information and a first processor. The method also includes communicating the transceiver information and the electronics-equipment information to the first processor and forming therein processed information. The processed information is then communicated to a second processor in a database unit.

A ninth aspect of the invention is a RFID-based system for collecting information from a telecommunications network. The system includes a transceiver having a socket configured to connect to an optical fiber connector, the transceiver including transceiver circuitry configured to store information ("transceiver-stored information"). The system also includes a portable test device having a memory unit and a RF reader attached to the memory unit and configured to engage with the transceiver socket to form an electrical connection between the transceiver circuitry and the memory unit. The memory unit and transceiver circuitry are configured to transfer the transceiver-stored information to the memory unit and then to the RF reader.

A tenth aspect of the invention is a RFID-based system for collecting information from electronics equipment of a telecommunications system. The system includes at least one transceiver port in the electronics equipment. The system also includes a memory chip in the electronics equipment that is configured to store electronics-equipment information. The system further includes a portable test device having a memory unit and a RF reader attached to the memory unit. The portable test device is configured to engage with the transceiver port to form an electrical connection between the memory chip and the memory unit. The memory unit and the memory chip are configured to transfer the electronics-equipment information to the memory unit and then to the RF reader.

These and other aspects of the invention are described below. It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate the various exemplary embodiments of the invention, and together with the description serve to explain the principals and operations of the invention.

DETAILED DESCRIPTION OF THE INVENTION

The present invention is directed to the use of RFID systems, and in particular is directed to RFID-based systems and methods for collecting identity and/or diagnostic information from a telecommunications network.

Collecting Transceiver Identity and/or Diagnostic Information

Figure 1:
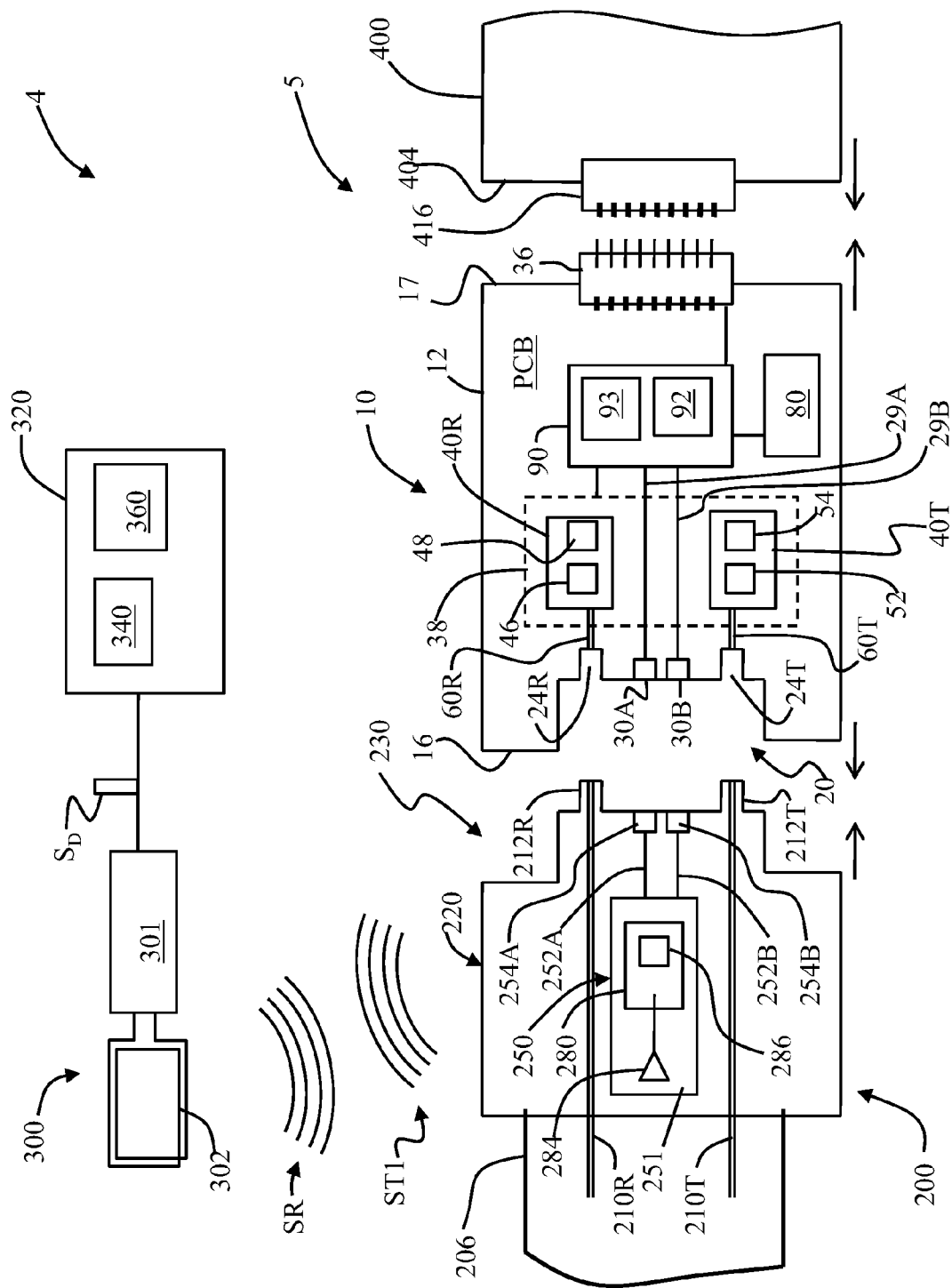
FIG. 1 is a schematic partially exploded diagram of a first example embodiment of a RFID-based information-collection system according to the present invention for collecting identity and/or diagnostic information from a portion of a telecommunications network comprising a connector, a transceiver and electronics equipment.
Figure 2:
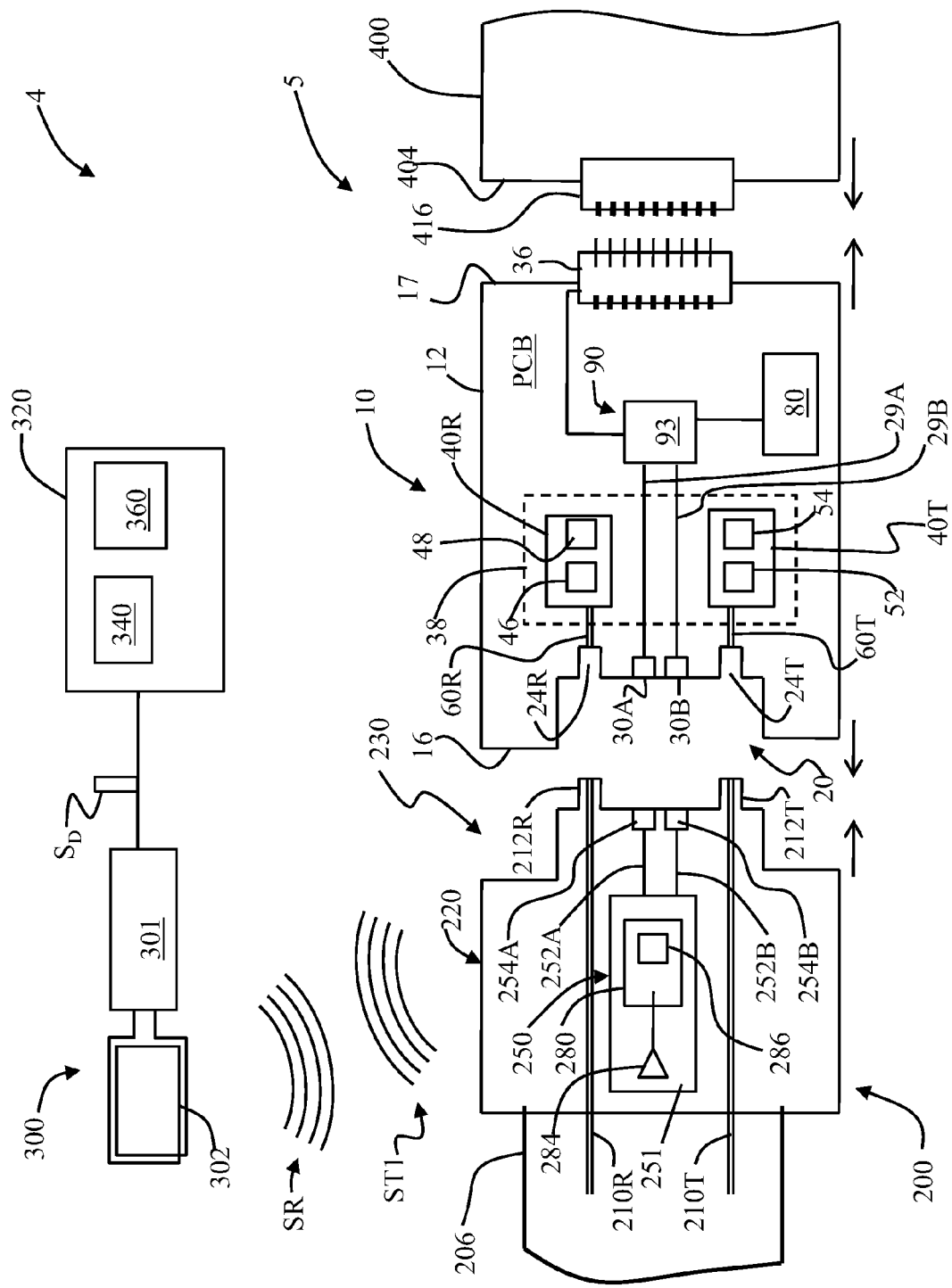
FIG. 2 is a schematic diagram similar to FIG. 1, illustrating an example embodiment wherein the transceiver circuitry comprises a digital diagnostic unit.

FIG. 1 is a schematic partially exploded diagram of a first example embodiment of a RFID-based information-collection system 4 according to the present invention for collecting identity and/or diagnostic information from a portion of a telecommunications network 5. System 4 is at least partially integrated with the network equipment of telecommunications network portion 5. In an example embodiment, telecommunications network portion 5 includes an optical transceiver ("transceiver") 10 (e.g., a SFP transceiver) optically coupled to an optical fiber connector 200, which is described in detail below. Electronics equipment 400 is also shown as being connected to (or hosting) SFP transceiver 10, as discussed in greater detail below.

Transceiver

Example embodiments of transceiver 10 are disclosed in U.S. Pat. Nos. 5,047,835; 6,878,875; 7,264,405; and 7,287,916, all of which are incorporated by reference herein. A two-fiber transceiver 10 is described below by way of illustration. One skilled in the art will recognize that the present invention applies to the myriad types of transceivers available today, including single-fiber transceivers, and multi-fiber transceivers.

In one example embodiment shown by way of illustration, transceiver 10 of FIG. 1 includes a modular housing 12 having a front end 16 with a port or socket 20 formed therein that includes two optical ports 24R and 24T (receive and transmit, respectively) and two electrical contacts 30A and 30B. Housing 12 also includes a back end 17 that has an electrical connector 36 (e.g., an edge connector).

Transceiver 10 includes a printed circuit board PCB that operably supports a number of electrical, optical and optoelectronic components. Such components include, for example, transceiver opto-electronics 38 that include an input receiver optical subassembly (ROSA) 40R and an output transmitter optical subassembly (TOSA) 40T. ROSA 40R comprises a photodiode 46 for detecting optical signals and sensing circuitry 48 connected thereto for converting the optical signals to digital signals compatible with other network equipment. TOSA 40T comprises a laser 52 for transmitting optical signals and control circuitry 54 connected thereto for modulating the laser according to an input digital data signal.

Photodiode 46 of ROSA 40R is optically coupled to a receive optical fiber 60R that terminates at optical port 24R. Likewise, laser 56 of TOSA 40T is optically coupled to a transmit optical fiber 60T that terminates at optical port 24T.

ROSA 40R and TOSA 40T are electrically connected to transceiver circuitry 90, which is electrically connected to back-end electrical connector 36. Transceiver circuitry 90 is discussed in greater detail below. Connector 36 is used to connect transceiver 10 to "electrical equipment" 400, which may be for example, a computer, server, router or other network equipment. The design of transceiver 10 is typically standards-based so that it can connect with network equipment such as electrical equipment 400 without significant customization. An example embodiment of transceiver 10 includes a DC power source 80 connected to transceiver circuitry 90, as shown. Other embodiments of transceiver 10 do not have a DC power source and instead receive their DC power externally (e.g., via electronics equipment 400).

Figure 3:
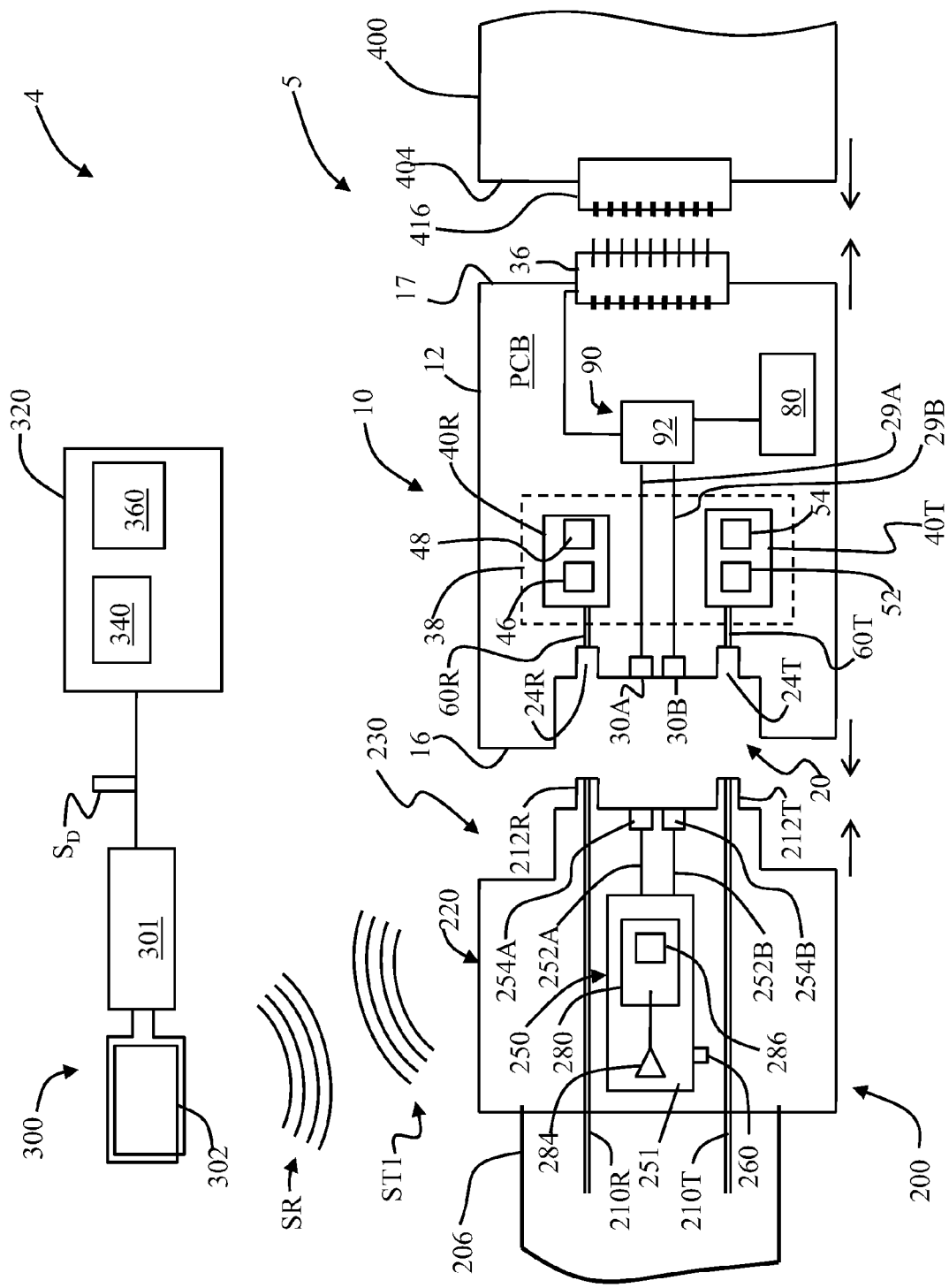
FIG. 3 is a schematic diagram similar to FIG. 2, illustrating an example embodiment wherein the transceiver circuitry comprises a memory unit connected to the transceiver optoelectronics.

Various types of and functionalities for transceiver circuitry 90 are contemplated by the present invention. In an example embodiment, transceiver circuitry 90 comprises a memory chip 92 adapted to store information. In an example embodiment, memory chip 92 is configured to receive and store information, and in particular identity and diagnostic transceiver information. FIG. 3 illustrates an example embodiment of system 4 wherein transceiver circuitry 90 comprises a digital diagnostic unit 93. Digital diagnostic unit 93 is configured to acquire diagnostic information relating to the operation of transceiver 10 (such as the diagnostic information described above) from various components within the transceiver and store the acquired diagnostic information. In an example embodiment, transceiver circuitry 90 includes both a memory chip 92 and a digital diagnostic unit 93, such as shown in FIG. 1.

In an example embodiment, transceiver circuitry 90 includes an existing IC chip in transceiver 10 (e.g., part of transceiver opto-electronics 38). In another example embodiment, transceiver circuitry 90 is added to transceiver 10 to provide the additional information-collection and inter-chip communication capabilities described below. In an example embodiment, transceiver circuitry 90 has both memory and digital diagnostic capability as well as chip-to-chip communication capability. In an example embodiment, transceiver circuitry 90 is an IC chip that includes the above-mentioned information-collection and chip-to-chip communication capabilities. Information stored in transceiver circuitry 90 is referred to herein as "transceiver-stored information" to distinguish from the more specific instance where information about the transceiver itself ("transceiver information") is stored in the transceiver circuitry and/or elsewhere.

In an example embodiment, transceiver circuitry 90 includes transceiver information, such as identity information in the form of, for example, an identification number (e.g., a 32-bit unique identifier), that in turn may include one or more pieces of data, such as a transceiver serial number, component type, component manufacturer, manufacturing date, installation date, location, lot number, performance parameters (such as attenuation measured during installation), identification of what component is at the other end of the transceiver and the status of that component, etc. In an example embodiment, the identify information is stored (e.g., pre-installed) in transceiver circuitry 90.

In an example embodiment, transceiver circuitry 90 also stores transceiver information in the form of diagnostic information (e.g., in 16-bit diagnostic words) relating to the operation of transceiver 10, such as transmit power, receive power, back-fact monitor current, temperature, loss-of-signal, etc.).

Note that transceiver 10 is thus adapted not only for communicating optical information via ROSA 40R and TOSA 40T, but is also adapted to store information in transceiver electronics 90 and electrically communicate this transceiver-stored information as described below.

Connector

Optical fiber connector 200 is attached to an end of a fiber optic cable 206 that in an example embodiment includes receive and transmit optical fibers 210R and 210T. Connector 200 includes a modular plug-type connector housing 220 having an input end 230 configured to engage with transceiver socket 20. Socket 20 is configured so that fibers 210R and 210T optically connect with respective transceiver receive and transmit fibers 60R and 60T at respective receive and transmit connector plug ends 212R and 212T that engage respective transceiver receive and transmit optical ports 24R and 24T.

In an example embodiment, optical fiber connector 200 also includes a RFID tag 250. RFID tag 250 includes a substrate 251 that supports electrical leads 252A and 252B, which lead to electrical contacts 254A and 254B at input end 230. Electrical contacts 254A and 254B are configured to mate with or otherwise establish contact with transceiver electrical contacts 30A and 30B.

Electrical leads 252A and 252B are connected to a RFID integrated circuit (RIC) chip 280 within RFID tag 250. RFID tag 250 also includes a RFID antenna system 284 that is preferably supported by substrate 251 and that is electrically connected to RIC chip 280. RFID antenna system 284 is adapted to generate tag signals ST1 that includes information received by or in stored in RIC chip 280. In an example embodiment, RFID tag 250 is passive and receives a reader signal (discussed below) and "generates" tag signals ST1 by reflecting or backscattering the reader signal in a manner than imparts information onto the tag signals.

RIC chip 280 is configured (e.g., with a memory unit 286) to store information ("connector-stored information"), such as identification (ID) numbers $N_1, N_2, \ldots N_j$ (e.g., 32-bit unique identifiers) that in turn may include one or more pieces of data, such as a connector serial number, component type, component manufacturer, manufacturing date, installation date, location, lot number, performance parameters (such as attenuation measured during installation), identification of what is at the other end of the component and the status of that component, etc. In general, RIC chip 280 can store any information capable of being stored in an IC chip. RIC chip 280 is configured (e.g., programmed) to receive and/or exchange information (and generally engage in chip-to-chip communication) with another IC chip or circuitry, and in particular with transceiver circuitry 90. Information stored in connector 200 (e.g., in RIC chip 280) is referred to as "connector-stored information" to distinguish from the more specific instance where information about the connector (called "connector information") is stored in the connector. For example, the connector-stored information can include transceiver information communicated between transceiver circuitry 90 and RIC-chip 280. Likewise, transceiver-stored information can include connector information communicated from RIC-chip 280 to transceiver circuitry 90.

An exemplary RFID tag 250 is disclosed in U.S. patent application Ser. No. 61/011,194, entitled "RFID systems and methods for automatically detecting and/or directing the physical configuration of a complex system," filed on Jan. 15, 2008 and assigned to Corning Cable Systems LLC, and which patent application is incorporated by reference herein. In an example embodiment, RFID tag 250 (which is also referred to in the art as an "RFID transponder") includes a switch (e.g., a push-button-type switch) 260 (FIG. 3 and FIG. 4) that electrically connects/disconnects and activates/deactivates the RFID antenna so that a person (e.g., a technician) installing or maintaining network equipment can selectively activate the RFID tags during the process.

In another embodiment, switch 260 provides a latchable signal to RIC chip 280 as an IC input rather than or in addition to connecting or activating the antenna. For example, a field technician can activate the RFID tag to cause it to generate a tag signal ST1 representative of the type of component or network equipment to which the RFID tag is attached, and where the network equipment is to be connected. An example of such a RFID tag 250 is described in U.S. patent application Ser. No. 11/590,377, entitled "Radio Frequency Identification Transponder for Communicating the Condition of a Component," which patent application is assigned to Corning Cable Systems, LLC, and which patent application is incorporated by reference herein. An example RFID tag 250 is compliant with RFID communication standards such as EPC Global class 1, and is a "Gen2" type of RFID tag.

With reference again to FIG. 1, RFID-based information-collection system 4 includes a RF reader 300 that includes RFID electronics 301 connected to a RF antenna system 302. In an example embodiment, antenna system 302 is adapted to receive tag signals ST1 and transmit reader signals SR. RF reader 300, and in particular antenna system 302, is preferably arranged relative to transceiver 10 and connector 200 so that it can receive tag signals ST1 from RFID tag 250. Reader signals SR are also called "interrogation signals" because they elicit or otherwise cause RFID tag 250 to generate tag signals.

RFID-based information-collection system 4 further includes an information processing system 320, such as a computer, operably connected to RF reader 300 and adapted to store and process information from the RF reader. In an example embodiment, information processing system 320 is adapted to receive wired or wireless data signals $S_D$ from RF reader 300. Information processing system 320 includes a database unit 340 adapted (e.g., via database unit software stored on a computer-readable medium) to store and process information, particularly information about RFID tags 250 provided to the information processing system from RF reader 300. In an example embodiment, database unit 340 includes basic (e.g., background or general) information about connector 200 and/or transceiver 10.

In an example embodiment, this basic information is inputted into database unit 340 (e.g., manually, or via an external computer-readable medium 342 (FIG. 4) such as a compact disk or so-called "memory stick") prior to information being received from RF reader 300. In an example embodiment, database unit software includes network management software designed to manage telecommunications system portion 5 as well as the other portions of the telecommunications system (not shown). Part of this management functionality includes, for example, the ability to identify relationships and associations between the various components of the telecommunications network portion 5, including relationships and associations between various connectors 200, transceivers 10, and electronics equipment 400 components (e.g., ports) therein.

In an example embodiment, information processing system 320 includes a display 360, such as a standard LCD monitor or personal digital assistant (PDA), that displays (e.g., using graphics and/or alphanumerics) the system configuration information stored in database unit 340.

Database unit 340 within information processing system 320 stores and process the information from RFID tag 250. In an example embodiment, the network management software in database unit 340 combines (e.g., processes) the information received from RF reader 300 with previously stored basic information about transceiver 10. This combined information is then optionally displayed on display 360 to provide a user with a (real-time) view of transceiver 10. Example embodiments of the role of the network management software of system 4 in managing identity and/or diagnostic information relating to connector 200, transceiver 10 and/or electronics equipment 400 is discussed in greater detail below.

Example Methods of Operation

Figure 4:
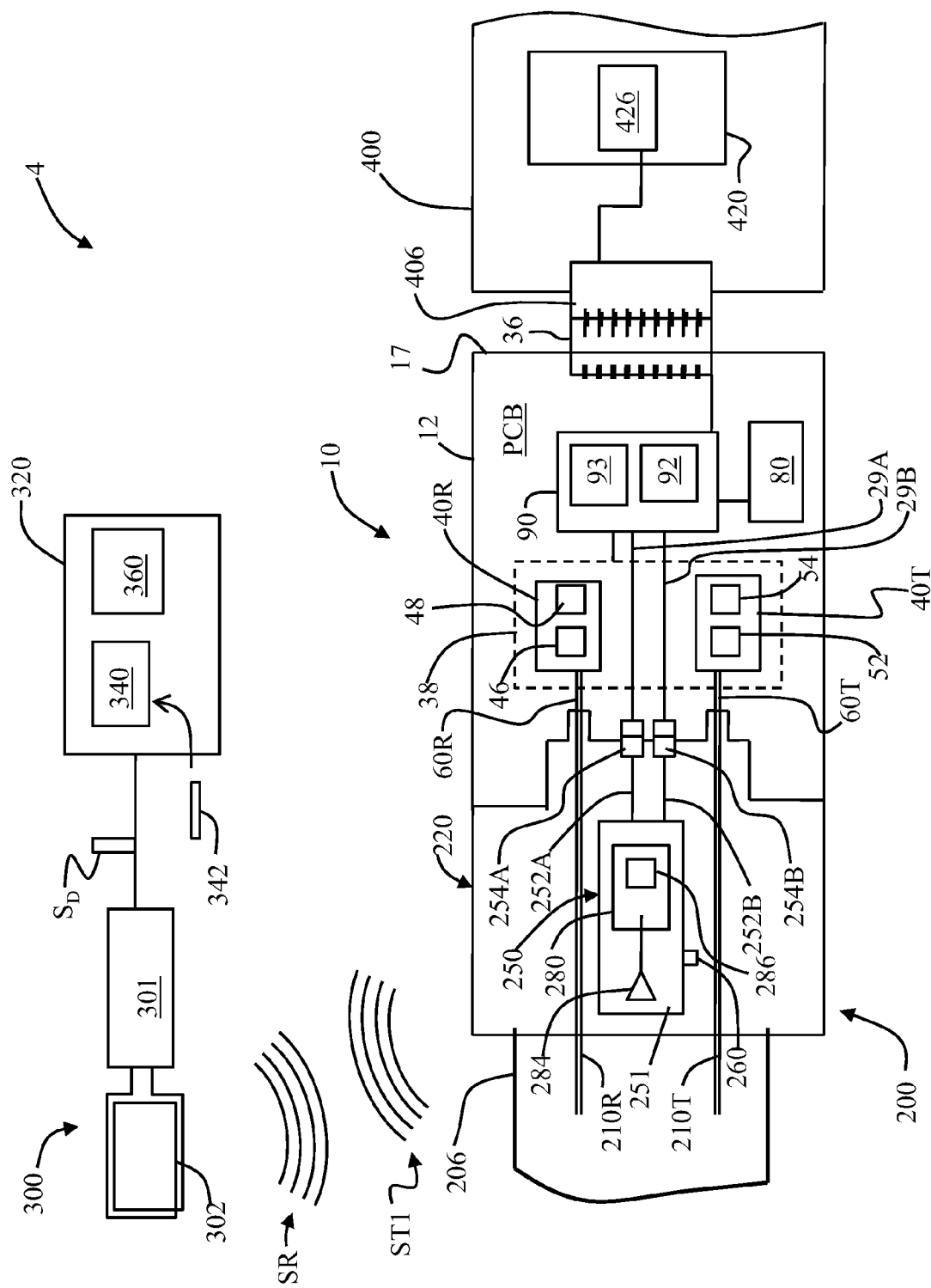
FIG. 4 is a schematic diagram of the RFID-based information-collection system and telecommunications network portion of FIG. 1, showing with the connector, transceiver and electronics equipment all operably connected.

FIG. 4 is an unexploded view of RFID-based information-collection system 4 of FIG. 1 that illustrates connector 200, transceiver 10 and electronics equipment 400 in their connected configuration. In FIG. 4, some reference numbers shown in FIG. 1 are omitted in order to show the connection more clearly.

In an example embodiment of the operation of RFID-based information-collection system 4, connector 200 is connected to transceiver 10 at socket 20. This causes the receive and transmit optical fibers 210R and 210T in connector 200 to optically connect to their transceiver 10 counterparts 60R and 60T, thereby establishing an optical connection between the connector and the transceiver. Likewise, RFID tag electrical contacts 254A and 254B electrically connect to their transceiver counterparts 30A and 30B, thereby establishing electrical connection between RIC chip 280 and transceiver circuitry 90.

At this point, transceiver-stored information can be communicated from transceiver circuitry 90 to RIC chip 280. As mentioned above, such information can include transceiver information, such as transceiver identity information (serial numbers, manufacturer, date installed, etc.) and/or transceiver diagnostic information. The diagnostic information may include, for example, connectivity status, temperature, laser power, receiver/detector power, data rate, power consumption, operational status, error information, loss of signal, back-face monitor current, etc. Likewise, connector-stored information can be communicated from RIC chip 280 to transceiver circuitry 90. Such information can include the aforementioned connector information, as well as any other information provide to the RIC chip 280, such as from reader signals SR from RF reader 300.

In an example embodiment, the circuit-to-chip (or chip-to-chip) communication is carried out using, for example, a one-wire or two-wire serial interface running in the range of 10-100 kB/sec, using a method such as pulse-width modulation, IIC, parallel digital interface, or other methods and chip-to-chip signal protocols known in the art. The transceiver-stored information communicated from transceiver 10 to connector 200 is stored in RIC chip 280. Likewise, connector-stored information communicated from connector 200 to transceiver 10 is stored in transceiver circuitry 90 (e.g., in memory chip 92).

In an example embodiment where transceiver diagnostic information is communicated from transceiver circuitry 90 to RIC chip 280, the diagnostic information is communicated one diagnostic word at a time from digital diagnostic unit 93 in the transceiver circuitry to the RIC chip and stored in the RIC chip (e.g., in memory unit 286) using one of the known digital signal protocols. Each diagnostic word is assigned a specific number, known in advance, which number associates the numbered word with the parameter it represents. The diagnostic word number is communicated along with the word itself, so that RF reader 300 knows what information it has received from RFID tag 250.

Once the identity and/or the diagnostic information is communicated from transceiver 10 to RIC chip 280, this information (and optionally connector information) is communicated to RF reader 300 via a tag signal ST1 elicited by reader signals SR from the RF reader. Some or all of the received information is then communicated to information processing system 320 and database unit 340 therein. In an example embodiment, information processing system 320 is part of or is otherwise incorporated into RF reader 300.

As discussed above, database unit 340 preferably includes network management software adapted to process information and determine the current (i.e., real-time) configuration of telecommunications network portion 5 as well as the other portions of the network (not shown). Thus, the network configuration can be constantly updated as changes, such as network equipment being mated (connected) and unmated (disconnected) are made to the network and transmitted to database unit 340 via RF reader 300. This eliminates the need to manually record and enter physical location data on network equipment into the network management software both during set-up as well as during maintenance or when changing the network configuration for any reason. It also ensures that database 340 is completely accurate, even while new network equipment is being added or removed.

Collecting Upstream Identifier and/or Diagnostic Information

With continuing reference to FIG. 4, electronics equipment 400 includes an electrical connector 406 that is electrically connected to transceiver 10 at electrical connector 36. Electronics equipment 400 may be any type of network equipment used in a telecommunications network, as discussed above. In an example embodiment, electronics equipment 400 serves as the host for one or more transceivers 10.

Figure 5:
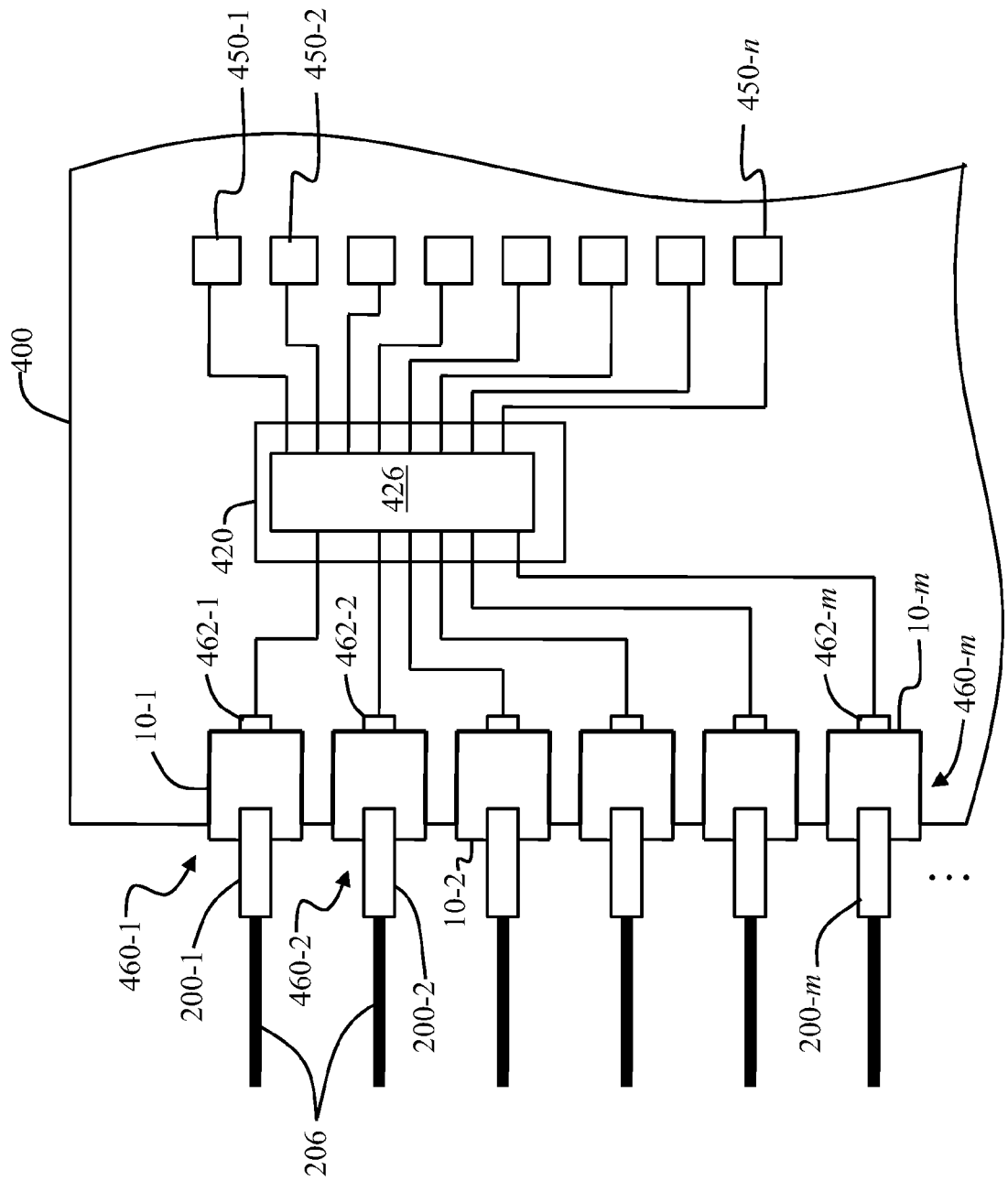
FIG. 5 is a close-up schematic diagram of an example embodiment of electronics equipment that serves as the host for a number of transceivers that are connected to a number of optical fiber cables, and that also includes a number of ports.

FIG. 5 is a close-up schematic diagram of an example embodiment of a telecommunications network portion 5 that shows electronics equipment 400 serving as a host for a number m of transceivers 10 (10-1, 10-2, ... 10-m) along with a corresponding number of connectors 200 (200-1, 200-2, ... 200-m). Electronics equipment 400 also has a number n of ports 450 (e.g., 450-1, 450-2, ... 450-n) that have corresponding port addresses (e.g., MAC or IP addresses). Electronics equipment 400 includes internal electronics 420 that in turn includes an IC ("EIC") memory chip 426. EIC memory chip 426 is configured to store electronics-equipment information, such as port information (e.g., MAC and IP addresses), type of equipment, date installed, operational parameters, diagnostic information, etc. In an example embodiment, electronics equipment 400 includes m transceiver ports 460-1, 460-2, ... 460-m configured to receive and operably connect up to m transceivers 10 to internal electronics 420 via corresponding electrical connectors 462-1, 462-2, ... 462-m.

EIC memory chip 426 is electrically connected to transceiver ports 460 via electrical connectors 462 and is configured for chip-to-chip communication. In particular, EIC memory chip 426 is configured to communicate the stored electronics-equipment information to transceiver circuitry 90, which are also configured for chip-to-chip communication. In example embodiments discussed in greater detail below, transceiver-stored information in transceiver circuitry 90 is communicated to EIC memory chip 426. The communication of information between EIC chip 426 and transceiver circuitry 90 uses, for example, known parallel or serial digital communication protocols at data rates from 10 kB/s to 10 Mb/s.

In an example embodiment, the electronics-equipment information stored in transceiver circuitries 90 in transceivers 10 is then communicated to RIC chips 280 of connectors 200 and then to RF reader 300 using the methods discussed above when connectors 200 are connected to the corresponding transceivers. This process allows for system 4 to extract information from a telecommunications network beyond (i.e., upstream of) the initial physical layer represented by connectors 200.

In an example embodiment, the communication of electronics-equipment information to transceiver 10 occurs automatically when the transceiver is electrically connected to electronics equipment 400. In another example embodiment, the communication is initiated by electronics equipment 400 when it initializes a port identifier, and/or each time it changes a port identifier.

In another example embodiment, transceiver circuitry 90 is configured to initiate the communication of information periodically after the initial information transfer that occurs when the transceiver is first connected to electronics equipment 400.

In yet another example embodiment, the information transfer is initiated by RF reader 300 and reader signal SR after connector 200 is connected to transceiver 10, wherein RIC chip 280 sends a signal to transceiver circuitry 90 that causes the transceiver circuitry to initiate the information communication to the RIC chip. Various combinations of the above-described embodiments are also contemplated. Also, multiple communications may be used to transfer all of the electronics-equipment information to RIC chip 280 and then to RF reader 300.

Transceiver with RFID Tag

Figure 6A:
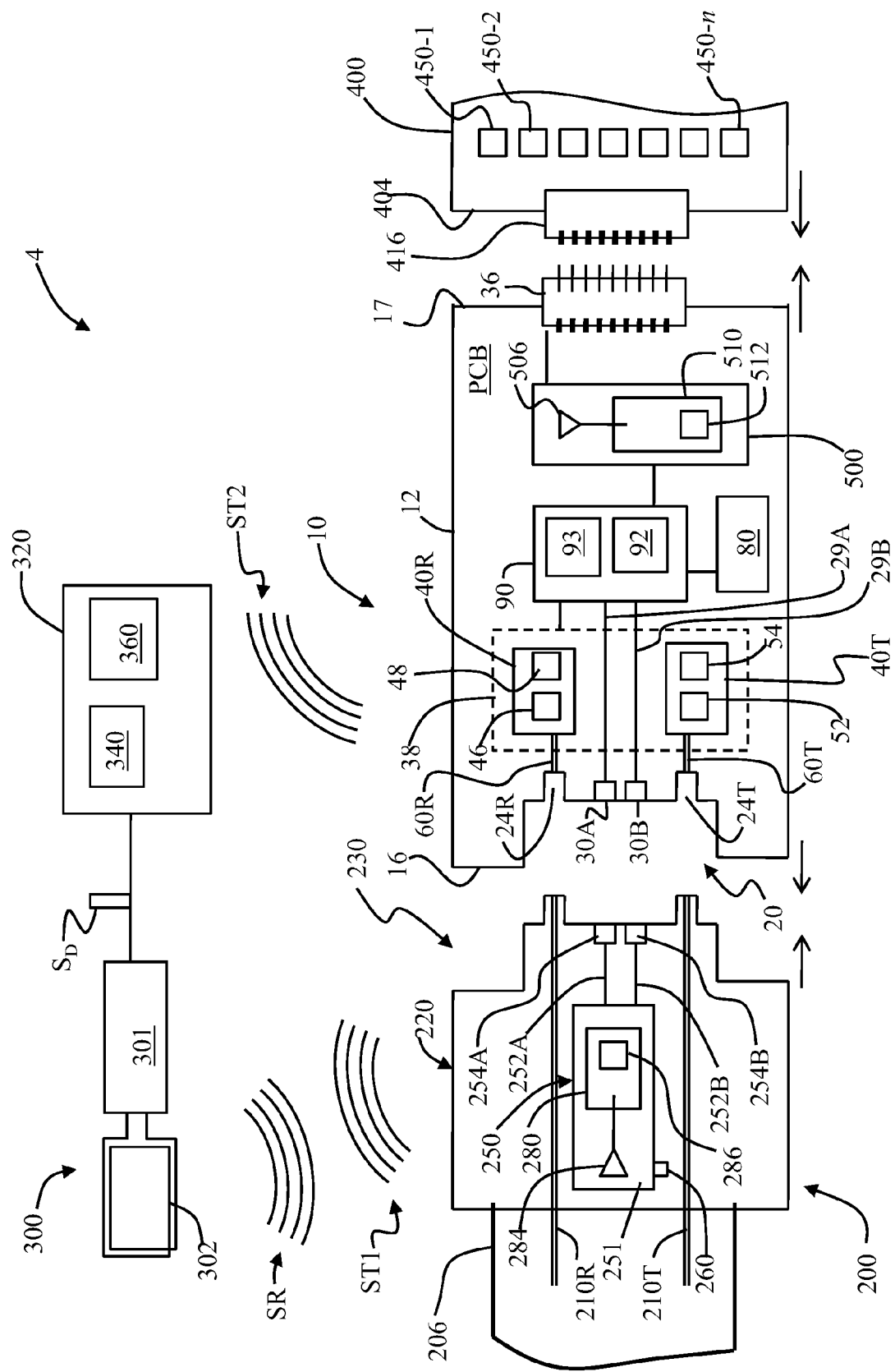
FIG. 6A is a schematic diagram similar to FIG. 1, but illustrating an example embodiment wherein the transceiver includes a RFID tag.
Figure 6B:
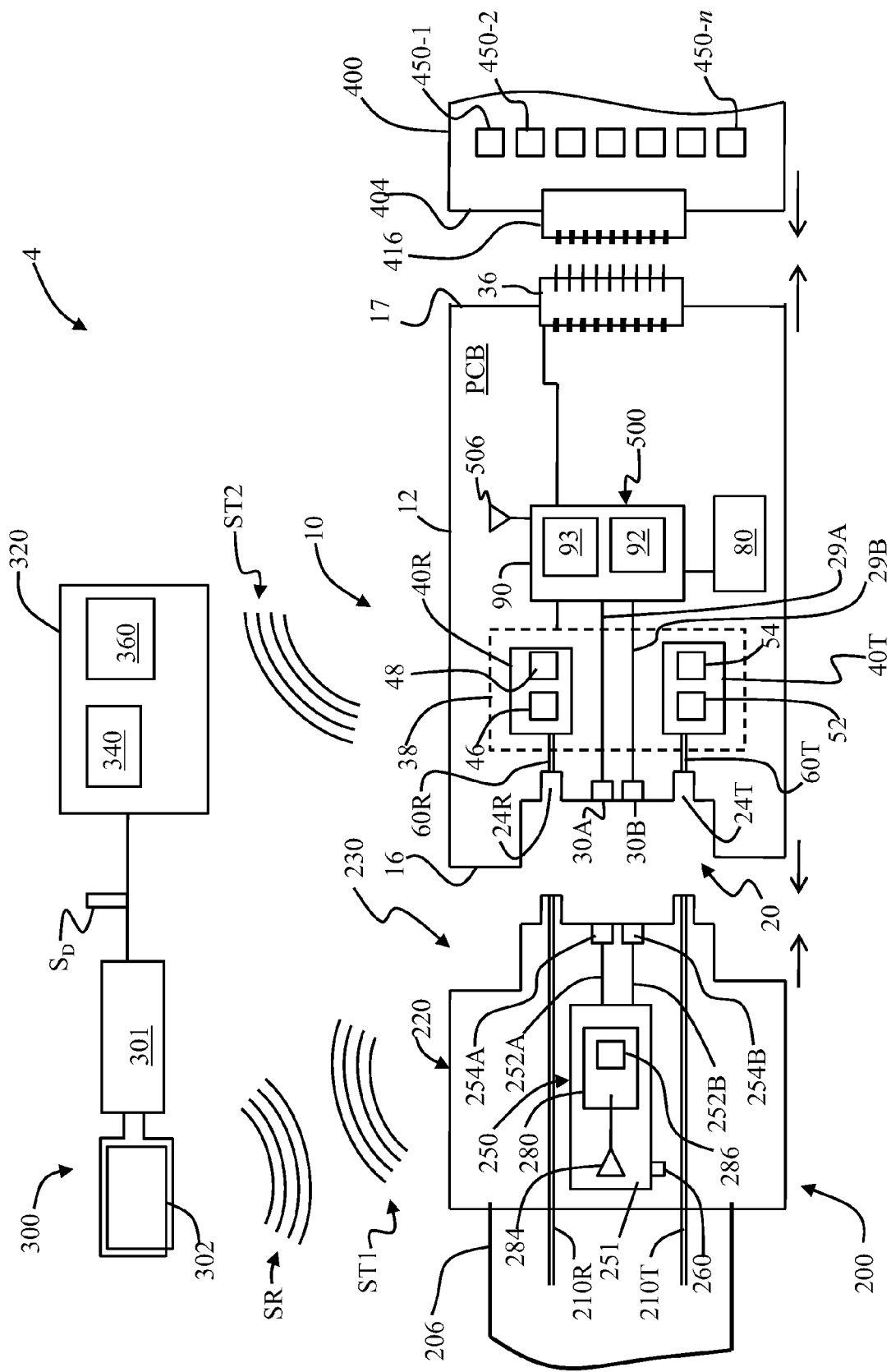
FIG. 6B is similar to FIG. 6A, except that the transceiver RFID tag includes the transceiver circuitry as an integrated circuit (IC) chip rather than a separate IC chip.

FIG. 6A is a schematic diagram similar to the RFID-based information-collection system 4 and telecommunication network portion 5 of FIG. 1, but illustrating an example embodiment wherein transceiver 10 further includes a RFID tag 500. The RFID tag 500 of FIG. 6A has an antenna system 506 electrically connected to an RIC chip 510 having a memory unit 512. FIG. 6B is a schematic diagram similar to FIG. 6A, illustrating an example embodiment where RFID tag 500 includes transceiver circuitry 90 connected to antenna system 506 and configured for RFID. In the example embodiment of FIG. 6B, transceiver circuitry 90 preferably comprises an IC chip. In the example embodiments of FIG. 6A and FIG. 6B, connector 200 may or may not have RFID tag 250, and may include RIC chip 280.

In the example embodiments shown in FIG. 6A and FIG. 6B, electronics-equipment information and/or transceiver information (e.g., identity and/or diagnostic information from the transceiver and the electronics equipment) stored in transceiver circuitry 90 (or in memory unit 512) is communicated directly to RF reader 300 from transceiver 10 from RFID tag 500 via a tag signal ST2 in response to reader signal SR. RF reader 300 can also identify the particular connector 200 connected to transceiver 10 either via tag signal ST1 from RFID tag 250, or from information included in tag signal ST2 after transceiver circuitry 90 receives the information from RIC chip 280. Likewise, tag signal ST2 can include electronics-equipment information rather than having to forward this information to the connector RFID tag 250 as discussed above.

This transceiver RFID tag embodiment allows for transceiver information and electronics-equipment information to be communicated to RF reader 300 without the need for a RFID-based connector 200. Also, in the case where connector 200 does not include a RFID tag or an RIC chip with connector information, the connector information can be inputted into database unit 340 directly by a system user such as a field technician. Further, once a connector 200 is connected to transceiver 10, connector information from RIC chip 280 can be communicated to transceiver circuitry 90 and then communicated via tag signal ST2 to RF reader 300. RF reader 300 then communicates some or all of the information it collects to information processing system 320 for further processing in database unit 340.

Portable Test Device

The present invention includes example embodiments that allow for a portable test device to directly electrically connect to a transceiver 10 or to electronics equipment 400 in order to obtain information about the transceiver and/or the electronics equipment.

Figure 7:
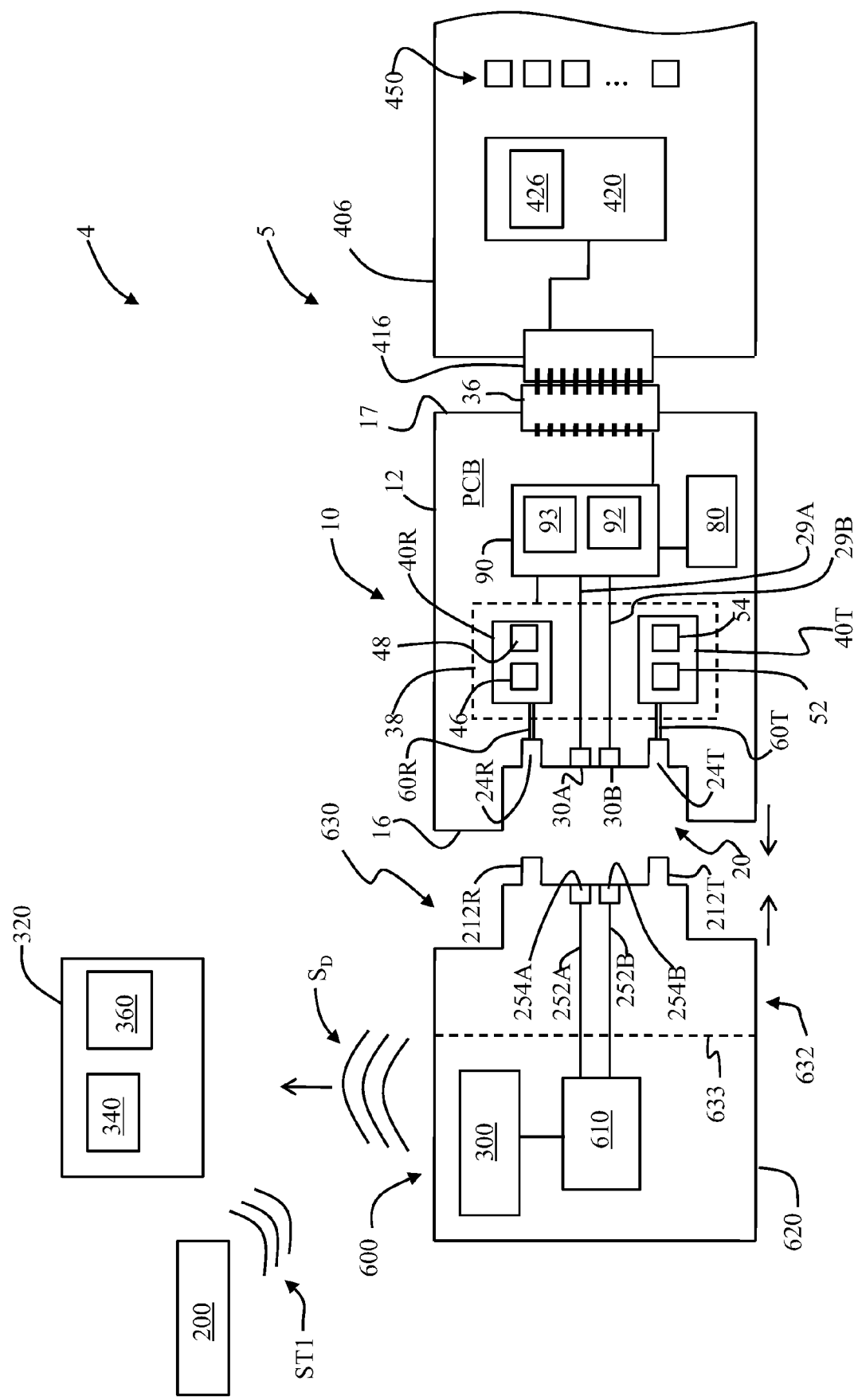
FIG. 7 is a schematic embodiment of RFID-based information-collection system and telecommunication network portion similar to that shown in FIG. 1, but illustrating an example embodiment wherein a portable test device is connected directly to transceiver.

FIG. 7 is a schematic embodiment of RFID-based information-collection system 4 and telecommunication network portion 5 similar to that shown in FIG. 1, but illustrating an example embodiment wherein a portable test device 600 is connected directly to transceiver 10. Portable test device 600 includes a housing 620 having an input end 630 configured to fit into transceiver socket 20. In an example embodiment, input end 630 is part of a connector 632 separate from housing 600 (illustrated schematically by dashed line 633) as illustrated in the example embodiment of FIG. 8, discussed below.

In an example embodiment, portable test device 600 includes RF reader 300 and also includes electrical leads 252A and 252B that lead to electrical contacts 254A and 254B at input end 230. Input end 230 is configured to engage transceiver socket 20 so that the test equipment electrical contacts 254A and 254B electrically contact transceiver electrical contacts 30A and 30B. Housing 620 may include "dummy" plug ends 212R and 212T that engage respective transceiver receive and transmit optical ports 24R and 24T to facilitate the connection between portable test device 600 and transceiver 10.

Housing 620 contains a memory unit 610 that is electrically connected to electrical leads 252A and 252B and to RF reader 300. In an example embodiment, memory unit 610 is used for storing information (e.g., MAC, IP addresses, etc.) for electronics equipment ports 450 (FIG. 5). When portable test device 600 is interfaced with transceiver 10, transceiver information (which as described above can be stored in transceiver circuitry 90, memory unit 92 and/or digital diagnostic unit 93) and/or electronics-equipment information (e.g., port identifier information) such as stored in memory unit 426 is communicated to memory unit 610. This information is then provided directly to RF reader 300. In an example embodiment, the user of portable test device 600 activates RF reader 300 therein to interrogate connector RFID tag 250 in a nearby connector 200 (which is unconnected to transceiver 10) to elicit tag signal ST1 from the connector RFID tag to obtain connector information. Some or all of the information collected in RF reader 300 is then optionally communicated via data signal $S_D$ to information processing system 320 and database unit 340 therein for storage and processing by the network management software. The aforementioned nearby connector 200 can then be connected to transceiver 10 once portable test device 600 is disconnected from the transceiver.

Figure 8:
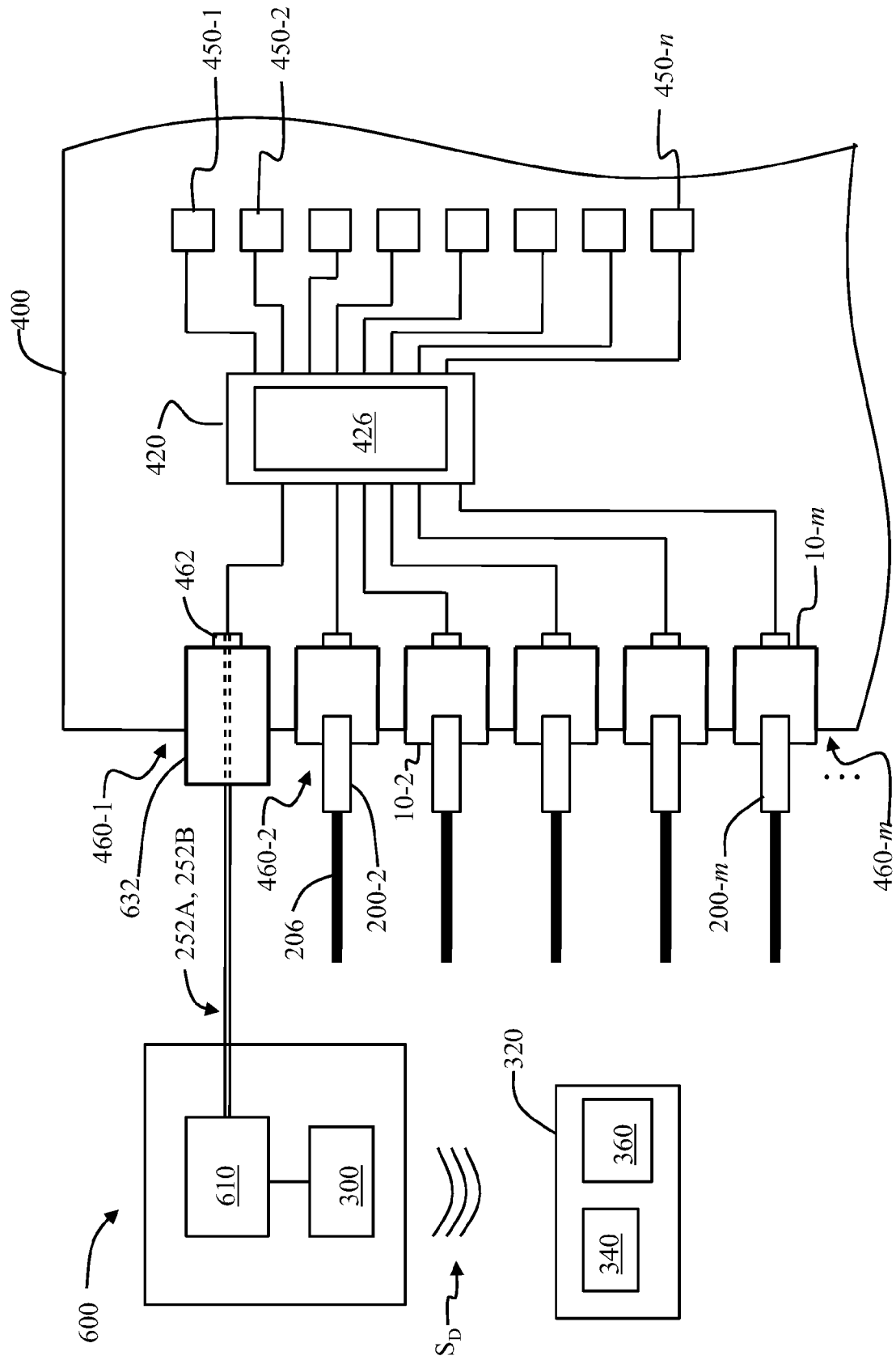
FIG. 8 is a schematic diagram similar to FIG. 5, illustrating an example embodiment where the portable test device is adapted to plug directly into a transceiver port of the electronics equipment.

FIG. 8 is a schematic diagram of an example embodiment of RFID-based information-collection system 4 similar to that shown in FIG. 5, but wherein portable test device 600 electrically connects directly to a transceiver port 460 in electronics equipment 400 via a test equipment connector 632. In this embodiment, electronics-equipment information is communicated from memory chip 426 in internal electronics 420 through connector 632 to memory unit 610 and then to RF reader 300. Some or all of the information collected in RF reader 300 is then optionally communicated via data signal $S_D$ to information processing system 320 and database unit 340 therein for storage and processing by the network management software.

Collecting Downstream Identifier and/or Diagnostic Information

Figure 9A:
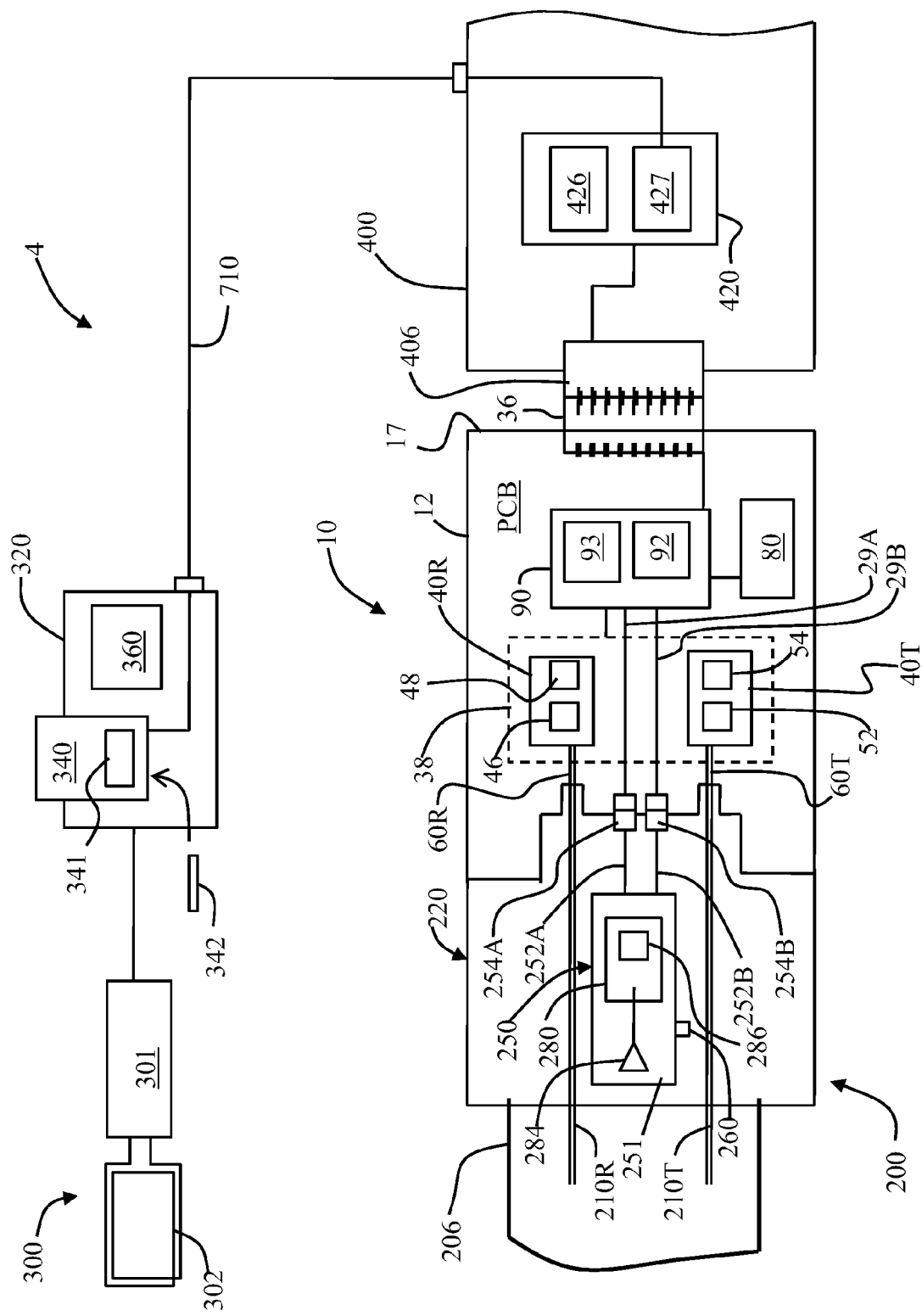
FIG. 9A is a schematic diagram of an example embodiment of the RFID-based information-collection system similar to that shown in FIG. 4, wherein the system is configured so that connector information and/or transceiver information is communicated to a processor in the electronics equipment.

FIG. 9A is a schematic diagram of an example embodiment of RFID-based information-collection system 4 similar to that shown in FIG. 4, wherein the system is configured so that connector information in connector 200 and/or transceiver information in transceiver 10 is communicated to electronics equipment 400 and stored in internal electronics 420, e.g., in EIC memory chip 426, and then processed in a EIC processor 427 connected to the EIC memory chip. In an example embodiment, EIC processor 427 includes network management software the same as or similar to that in database 340 and is configured to map other otherwise process connector information, transceiver information and/or electronics-equipment information to form "processed information" that establishes relationships or associations between various connectors, transceivers and electronics equipment (e.g., transceiver ports 460). In an example embodiment, EIC processor 427 resides in a server, e.g., on a server blade. The processed information in EIC processor 427 is then communicated to database unit 340 for further processing. In an example embodiment, database unit includes a processor 341 operably connected to EIC processor 427, and the two processors are configured to act in synchrony to process information, e.g., using the same network management software.

In one example embodiment, connector information from connector 200 is communicated to transceiver 10 as discussed above in connection with FIG. 6A and FIG. 6B. However, instead of transceiver 10 communicating the connector and/or transceiver information to RF reader 300 via a transceiver RFID tag 500, the transceiver communicates the connector information and/or the transceiver information to electronics equipment 400 and to EIC processor 427. EIC processor 427 is operably connected via a communication link 710 (e.g., an Ethernet link) to database unit 340, which as mentioned above, in an example embodiment includes another processor 341 configured with mapping software identical to or similar to that in EIC processor 427. Thus, EIC processor 427 can transmit processed information to database unit 340 via a second data signal $S_D$. This configuration allows for mapping connector, transceiver and electronics-equipment information to occur outside of connector 200 and transceiver 10. This configuration also provides an alternative method of establishing an extended database unit 340 by operably connecting two or more processors.

Figure 9B:
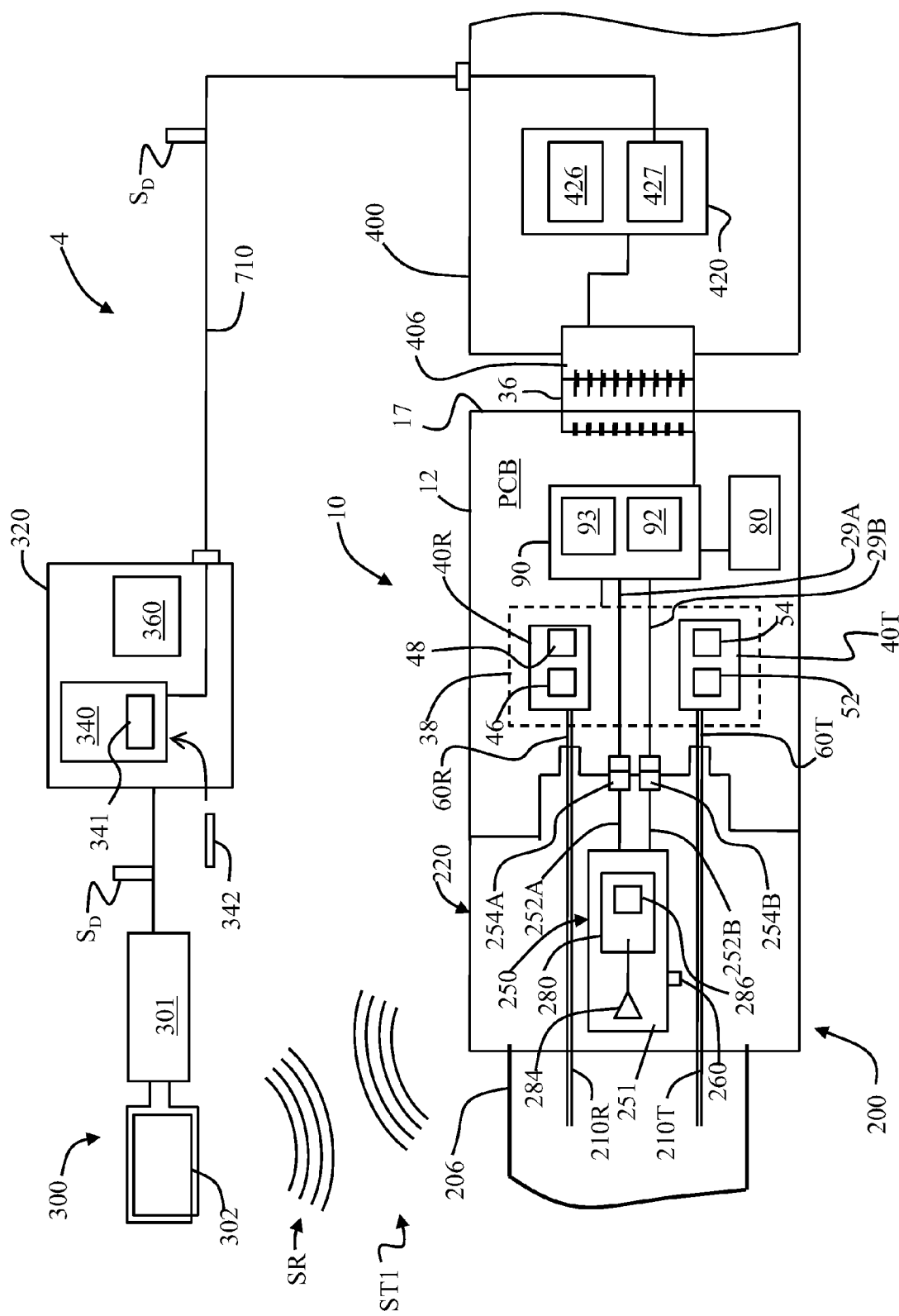
FIG. 9B is similar to FIG. 9B, but illustrates an example embodiment wherein the connector information is communicated to the database unit via the RF reader rather than through the processor in the electronics equipment.

FIG. 9B is similar to FIG. 9A and illustrates an example embodiment wherein connector 200 communicates connector information to database 340 via RF reader 300 and a first data signal $S_D$ in the manner discussed above in connection with FIG. 1 through FIG. 4. In this embodiment, transceiver 10 only communicates transceiver information to electronics equipment 400 and to internal electronics 420. EIC processor 427 then optionally processes the information and communications the processed information to database unit 340 (and to processor 341) via a second data signal $S_D$ over communication link 710. Alternately, internal electronics 420 passes the unprocessed information directly to database unit 340 via communication link 710.

Information Processing and Mapping

As discussed above, database unit 340 of information processing system 320 stores and process the information via RF reader 300 collected using one or more of the above-mentioned systems and methods. In an example embodiment, the network management software in database unit 340 is configured to combine (e.g., process) the information received from RF reader 300 with previously stored basic information about transceiver 10, connector 200 and/or electronics equipment 400. In another example embodiment, database unit 340 is in operable communication with EIC processor 427 in equipment electronics 400 so that information sent downstream to the electronics equipment can be processed in the electronics equipment and then combined in the database with information obtained via RF reader 300 or previously stored in the database. The network management software operating in database unit 340 operates to output associations or relationships ("mappings") between one or more connectors 200, one or more transceivers 10 and one or more electronics equipment 400 for the given telecommunications network 5. Note that in the case where information is processed in EIC processor 427 and database processor In an example embodiment, information processed by database unit 340 is displayed on display 360 to provide a user with a (real-time) view of the mapping of telecommunications network 5. In a particular example embodiment, the various associations and relationships amongst connectors 200, transceivers 10 and/or electronics equipment 400 is displayed on display 360.

In an example embodiment of RFID-based information-collection system 4, the network management software obtains identification information relating to ports 450 of electronics equipment 400, such as port addresses (e.g., MAC addresses or IP addresses). The information may be provided via transceiver 10 directly using RFID tag 500, or via connector RFID tag 250, or via portable test device 600, as discussed above. This allows the network management software to match the port identifier information (e.g., IP address or MAC address) with transceiver serial numbers. This further enables the connector identity to be associated with the transceiver serial number and/or the port identifier information in the network management software, thereby providing a port-connector map. Other maps can be created that associate one piece of telecommunications network information with another, such as connector-connector maps, transceiver-connector maps, etc.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A radio-frequency identification (RFID)-based system for collecting information from a telecommunications network, comprising:
    an optical transceiver having transceiver circuitry configured to perform at least one of storing, receiving and communicating information;
    an optical fiber connector having a connector RFID tag configured to store information and communicate with the transceiver circuitry when electrically connected to the optical transceiver, wherein the connector RFID tag is adapted to generate a connector RFID-tag signal that contains information stored in the optical fiber connector; and
    a RF reader adapted to produce a reader signal that elicits said connector RFID-tag signal and that is configured to store information contained in the connector RFID-tag signal.

2. The system of claim 1, wherein the connector-stored information includes connector identity information.

3. The system of claim 2, wherein the connector-stored information includes information stored in the optical transceiver and communicated to an RFID integrated circuit chip.

4. The system of claim 3, wherein the transceiver-stored information includes information about the optical transceiver.

5. The system of claim 4, wherein the transceiver-stored information includes at least one of transceiver identity information and transceiver diagnostic information.

6. The system of claim 5, wherein the transceiver circuitry includes a diagnostic unit adapted to obtain said transceiver diagnostic information from one or more transceiver components.

7. The system of claim 1, wherein the optical transceiver includes a transceiver RFID tag adapted to generate a transceiver RFID-tag signal that includes transceiver information and/or connector information.

8. The system of claim 7, further including electronics equipment electrically connected to the optical transceiver and that contains electronics-equipment information, and wherein the transceiver circuitry is adapted to obtain the electronics-equipment information and include said electronics-equipment information in the transceiver RFID-tag signal.

9. The system of claim 1, further comprising:
electronics equipment electrically connected to the optical transceiver and that contains electronics-equipment information; and
wherein the transceiver circuitry is adapted to obtain the electronics-equipment information and communicate it to the connector RFID tag so that the electronics-equipment information is included in the connector RFID-tag signal.

10. The system of claim 9, wherein the electronics equipment includes one or more ports, and wherein the electronics-equipment information includes port information pertaining to the one or more ports.

11. The system of claim 10, wherein the port information includes at least one of a MAC address and an IP address.

12. The system of claim 11, wherein:
the connector-stored information includes connector information;
the transceiver-stored information includes transceiver information; and
the RF reader is operably connected to an information processing system that includes network management software configured to map port information to at least one of the connector information and the transceiver information.

13. The system of claim 1, further comprising:
electronics equipment electrically connected to the optical transceiver and that contains electronics-equipment information, the electronics equipment including a first processor configured with software to process information and operably coupled to the transceiver circuitry, the first processor being adapted to receive transceiver-stored information and/or RFID integrated circuit chip-stored information via the optical transceiver.

14. The system of claim 13, further including
a database unit operably coupled to the RF reader and containing a second processor operably coupled to the first processor of the electronics equipment, the first and second processors being configured to communicate with each other and to process information.

15. A radio-frequency identification (RFID)-based system for collecting information from a telecommunications network, comprising:
an optical transceiver having a transceiver circuitry configured to perform at least one of storing, receiving and communicating information, including transceiver information;
electronics equipment that contains electronics-equipment information and that is operably connected to the optical transceiver so as to communicate the electronics-equipment information to the optical transceiver;
a transceiver RFID tag operably supported by the optical transceiver and adapted to generate a transceiver RFID-tag signal that includes the transceiver information and/or the electronics-equipment information; and
a RF reader adapted to generate a reader signal that elicits said transceiver RFID-tag signal and that is configured to store information contained in the transceiver RFID-tag signal.

16. The system of claim 15, further comprising:
an optical fiber connector configured to store connector information and to communicate the connector information to the transceiver circuitry when the optical fiber connector and transceiver circuitry are placed in electrical contact; and
wherein the transceiver RFID-tag signal includes said connector information.

17. The system of claim 16, wherein the transceiver RFID-tag signal includes the connector information, the transceiver information and the electronics-equipment information.

18. An information-collection system for collecting information from a telecommunications network, comprising:
an optical transceiver having a transceiver circuitry configured to perform at least one of storing, receiving and communicating information, including transceiver information;
electronics equipment operably connected to the transceiver and that contains electronics-equipment information and a first processor that operably supports information processing software, the electronics equipment and transceiver configured to communicate the transceiver information and the electronic information to the first processor;
a database having a second processor in operable communication with the first processor that that operably supports said information processing software; and
an optical fiber connector having a connector RFID tag with an RFID integrated circuit chip configured to store connector information, the RFID integrated circuit chip is adapted to communicate with the transceiver circuitry when the RFID integrated circuit chip and transceiver circuitry are placed in electrical communication via electrical contact between the connector and the transceiver, wherein the connector RFID tag is adapted to generate a connector RFID-tag signal that contains at least one of the connector information and the transceiver information.

19. A method of collecting information from a telecommunications network that includes an optical fiber connector and a transceiver, the method comprising:
storing transceiver information in the transceiver;
communicating the transceiver information to the optical fiber connector when the transceiver and optical fiber connector are operably coupled; and
using a RFID tag in the optical fiber connector, communicating to a RF reader a connector RFID-tag signal that includes the transceiver information.

20. The method of claim 19, wherein the optical fiber connector includes connector-stored information, and including communicating the connector-stored information in the connector RFID-tag signal.

21. The method of claim 20, further comprising:
connecting electronics equipment that contains electronics-equipment information to the transceiver;
communicating the electronics-equipment information to the optical fiber connector via the transceiver; and
including the electronics-equipment information in the connector RFID-tag signal.

22. The method of claim 20, wherein the electronics-equipment information includes port identification information.

23. A method of collecting information from a telecommunications network that includes a transceiver, the method comprising:
storing transceiver information in the transceiver;
using a RFID tag in the transceiver, transmitting to a RF reader a transceiver RFID-tag signal that includes the transceiver information;
connecting an optical fiber connector that contains connector information to the transceiver and communicating the connector information to the transceiver; and
including the connector information in the transceiver RFID-tag signal.

24. A method of collecting information from a telecommunications network that includes a transceiver, the method comprising:
storing transceiver information in the transceiver;
using a RFID tag in the transceiver, transmitting to a RF reader a transceiver RFID-tag signal that includes the transceiver information;
connecting electronics equipment that contains electronics-equipment information to the transceiver;
communicating the electronics-equipment information to the transceiver; and
including the electronics-equipment information in the transceiver RFID-tag signal.

25. The method of claim 24, wherein the electronics-equipment information includes port identifier information.

26. The method of claim 25, further comprising:
connecting an optical fiber connector that contains connector information to the transceiver;
communicating the connector information to the transceiver; and
including the connector information in the transceiver RFID-tag signal.

27. A method of collecting information from a telecommunications network that includes a transceiver having a port that connects to an optical fiber connector, the method comprising:
storing transceiver information in transceiver circuitry within the transceiver;
communicating the transceiver information to electronics equipment that includes stored electronics-equipment information and a first processor;
communicating the transceiver information and the electronics-equipment information to the first processor to form first processed information;
communicating the first processed information from the first processor to a second processor in a database unit;
connecting the optical fiber connector to the transceiver port, the optical fiber connector having stored therein connector-stored information;
communicating the connector-stored information via a RFID tag signal from the connector RFID tag to a RF reader; and
communicating the connector-stored information from the RF reader to the second processor.

* * * * *